United States Patent
Sewell et al.

(10) Patent No.: US 10,836,555 B2
(45) Date of Patent: Nov. 17, 2020

(54) PACKAGING APPARATUS

(71) Applicant: Sunrise MFG, Inc., Rancho Cordova, CA (US)

(72) Inventors: Matthew W. Sewell, El Dorado Hills, CA (US); Patrick M. Henley, Eagle Pass, TX (US); Michael V. Ritz, El Dorado Hills, CA (US); Oleksiy Zimbitskyy, Rancho Cordova, CA (US); Thomas R. Hickel, Sacramento, CA (US)

(73) Assignee: Sunrise MFG, Inc., Rancho Cordova, CA (US)

( * ) Notice: Subject to any disclaimer, the term of this patent is extended or adjusted under 35 U.S.C. 154(b) by 20 days.

(21) Appl. No.: 16/191,372

(22) Filed: Nov. 14, 2018

(65) Prior Publication Data

US 2019/0077568 A1    Mar. 14, 2019

Related U.S. Application Data

(63) Continuation of application No. 15/201,228, filed on Jul. 1, 2016, now Pat. No. 10,150,606.

(60) Provisional application No. 62/300,729, filed on Feb. 26, 2016.

(51) Int. Cl.
*B65D 81/107* (2006.01)
*B60P 7/135* (2006.01)

(52) U.S. Cl.
CPC ............ *B65D 81/107* (2013.01); *B60P 7/135* (2013.01)

(58) Field of Classification Search
CPC .... B65D 81/107; B65D 65/44; B65D 81/054; B65D 81/056; B65D 2581/083; B65D 2581/053; B60P 7/135
USPC ................ 206/594, 586, 523, 583, 521, 524
See application file for complete search history.

(56) References Cited

U.S. PATENT DOCUMENTS

| | | | | |
|---|---|---|---|---|
| 3,311,231 A | * | 3/1967 | English, Jr. .......... | B65D 75/323 206/523 |
| 4,709,817 A | * | 12/1987 | Keady .................. | B65D 81/107 206/521 |
| 4,784,269 A | | 11/1988 | Griffith | |
| 4,854,792 A | * | 8/1989 | Cottone .................... | B60P 7/12 410/118 |
| 5,040,696 A | | 8/1991 | Liebel | |
| 5,540,972 A | * | 7/1996 | Jaegers ................ | B31D 3/0292 428/116 |

(Continued)

*Primary Examiner* — Chun Hoi Cheung
(74) *Attorney, Agent, or Firm* — Dickinson Wright RLLP

(57) ABSTRACT

A packaging apparatus for providing protection against forces directed to an item (or items) is disclosed. The packaging apparatus designed to protect the item during, for example, transport of the item subject to sudden movement by a transportation vehicle (carrying the item) that may cause other items to contact the item. The packaging apparatus may include one or more force bearing features, each of which may include a fill material positioned to provide a counterforce against a force (or forces) in a direction toward the item. The packaging apparatus is also suitable for protecting cylindrical objects (such as drums) during transport. In this regard, several force bearing features disposed on opposing sides of a base member. Further, a strap can be secured to the transport vehicle to combine to provide additional force acting against unwanted movement of the items.

20 Claims, 16 Drawing Sheets

(56) References Cited

U.S. PATENT DOCUMENTS

| | | | |
|---|---|---|---|
| 5,647,708 A * | 7/1997 | Letts, III | B60P 7/065 |
| | | | 206/522 |
| 5,678,968 A * | 10/1997 | Bourgeois | B31F 1/0012 |
| | | | 206/522 |
| 5,680,934 A | 10/1997 | Jaegers et al. | |
| 5,683,781 A | 11/1997 | Komarek et al. | |
| 5,950,835 A * | 9/1999 | Moser | B31F 1/0009 |
| | | | 206/586 |
| 6,199,700 B1 | 3/2001 | Yamamoto et al. | |
| 6,569,073 B1 * | 5/2003 | Bridges | B65B 5/108 |
| | | | 493/183 |
| 6,969,548 B1 * | 11/2005 | Goldfine | B29C 44/1214 |
| | | | 428/159 |
| 7,398,884 B2 | 7/2008 | Stegner et al. | |
| 7,798,754 B2 * | 9/2010 | Funk | B60P 7/16 |
| | | | 206/522 |
| 8,308,411 B2 | 11/2012 | Funk et al. | |
| 8,727,682 B2 * | 5/2014 | Johnson | B60P 7/135 |
| | | | 410/96 |
| 9,656,791 B2 | 5/2017 | Yeh | |
| 2004/0129589 A1 | 7/2004 | Tucker et al. | |

\* cited by examiner

PACKAGING APPARATUS

CROSS-REFERENCE TO RELATED APPLICATION

This application is a continuation of U.S. application Ser. No. 15/201,228, filed Jul. 1, 2016, entitled "PACKAGING APPARATUS," which claims the benefit of priority under 35 U.S.C. § 119(e) to U.S. Provisional Application No. 62/300,729, filed on Feb. 26, 2016, entitled "COLLAPSIBLE PACKAGING APPARATUS," the disclosures of which are incorporated herein by reference in their entirety.

FIELD

The described embodiments relate to a packaging apparatus. In particular, the described embodiments relate to a packaging apparatus designed for use in packaging applications to protect an item(s) and counteract forces directed to the item(s).

BACKGROUND

Packaging devices may be designed to protect goods. In order to protect larger goods (or a large bundle of goods), some packaging devices may be also be large to include a size and shape in accordance with the larger goods (or large bundle of goods). In some cases, sensitive cargo carried in transit is subject to relatively large loads or forces by, for example, other cargo items colliding with the cargo during transit. In order to withstand larger forces, the packaging devices may further increase in size and shape.

However, as packaging devices become larger, they tend to occupy more space. As a result, a cargo truck trailer, having limited space, must allocate additional space to these larger packaging devices. This reduces volume available for cargo resulting less transported goods per trailer carry. As a result, shipping efficiency is reduced in terms of products transported per shipment. Similar space issues may occur in warehouses with limited space.

SUMMARY

In one aspect, a packaging apparatus for protecting an item is described. The packaging apparatus may include a base feature. The packaging apparatus may further include a force bearing feature secured with the base feature and configured to engage the item. The force bearing feature may include a fill material disposed in a longitudinal direction when the force bearing feature engages the item. In some embodiments, in response to a force provided to the force bearing feature by an object, the fill material provides a counterforce to prevent the object from contacting the item.

In another aspect, a packaging apparatus for protecting an item is described. The packaging apparatus may include a base feature having a first dimension in accordance with the item. The packaging apparatus may further include a first force bearing feature secured with the base feature and may include a first fill material. The packaging apparatus may further include a second force bearing feature secured with the base feature and may include a second fill material. Also, in some embodiments, in an extended configuration, the base feature is substantially flat and the first force bearing feature and the second force bearing feature are positioned to engage the item and the first fill material and the second fill material are positioned to provide a counterforce in response to a force in a direction of the item. Also, in a collapsible configuration, the base feature folds in a manner such that the base feature reduces to a second dimension less than the first dimension, the second dimension defined by the force bearing feature and the second force bearing feature.

In another aspect, a packaging apparatus for protecting items in a containment unit having a first wall and a second wall is described. The packaging apparatus may include a base member having a first side and a second side opposite the first side. The packaging apparatus may further include a first force bearing feature disposed on the first side. The packaging apparatus may include a second force bearing feature and a third bearing feature disposed on the second side at a location corresponding to the first force bearing feature. The packaging apparatus may include a strap secured with the first wall and the second wall. The strap may engage the base member and the first force bearing feature.

Other systems, methods, features and advantages of the embodiments will be, or will become, apparent to one of ordinary skill in the art upon examination of the following figures and detailed description. It is intended that all such additional systems, methods, features and advantages be included within this description and this summary, be within the scope of the embodiments, and be protected by the following claims.

BRIEF DESCRIPTION OF THE DRAWINGS

The disclosure will be readily understood by the following detailed description in conjunction with the accompanying drawings, wherein like reference numerals designate like structural elements, and in which.

Figure 1:
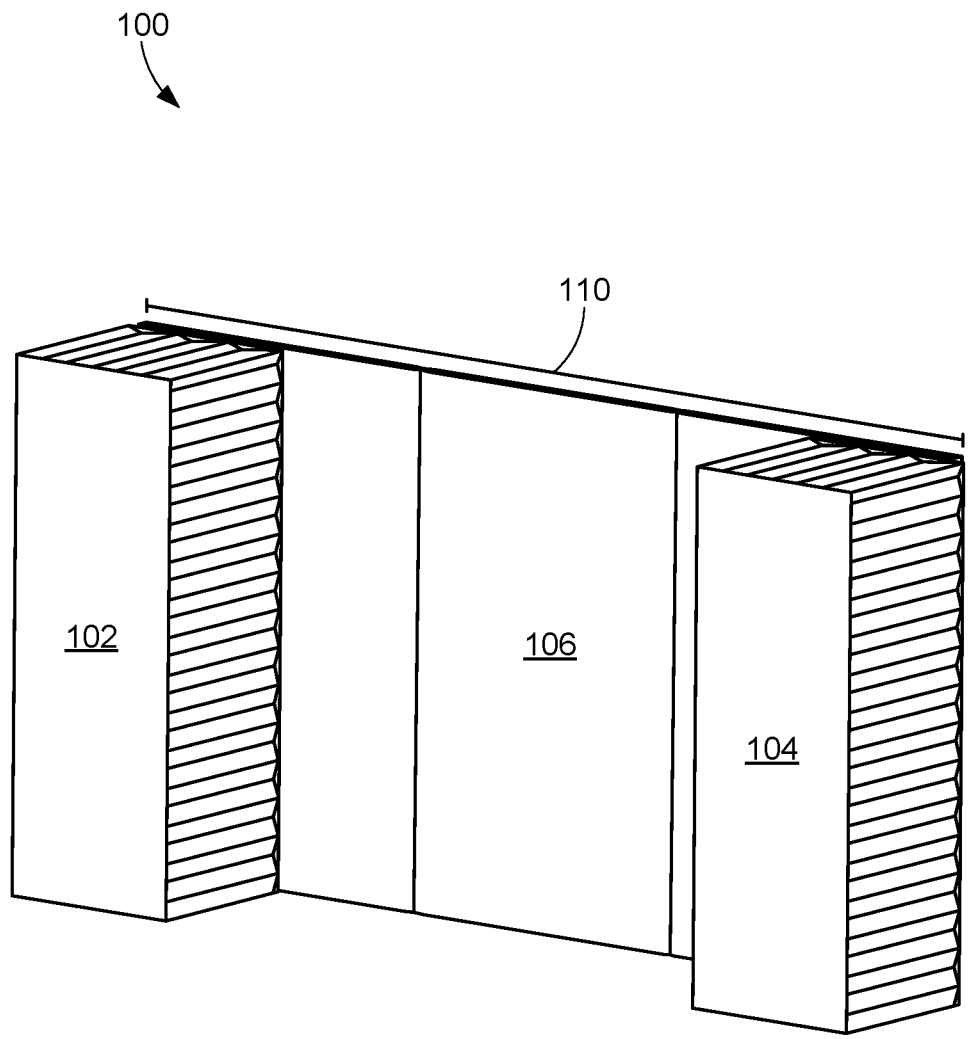
FIG. 1 illustrates an isometric view of an embodiment of a packaging apparatus, in accordance with the described embodiments.

Those skilled in the art will appreciate and understand that, according to common practice, various features of the drawings discussed below are not necessarily drawn to scale, and that dimensions of various features and elements of the drawings may be expanded or reduced to more clearly illustrate the embodiments of the present invention described herein.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting such that other embodiments may be used, and changes may be made without departing from the spirit and scope of the described embodiments.

The following disclosure relates to a packaging apparatus designed to protect cargo or goods during shipment. The packaging apparatus may be designed to abut the cargo and absorb a force (or forces) exerted in a direction of the cargo. Further, the force received by the packaging apparatus may be distributed throughout one or more structural components of the packaging apparatus in order to mitigate the force to the cargo.

The packaging apparatus may include a base feature. The base feature may include a paper-based material having a size and shape substantially similar to the cargo. Also, the base feature may include a flat, or substantially flat, designed with several fold regions that allow the base feature to bend or fold in predetermined locations (i.e., the fold regions). The packaging apparatus may also include one or more force bearing features secured with the base feature. The force bearing features may be designed to engage the cargo and absorb a force (or forces) exerted in a direction toward the cargo. In this regard, each force bearing feature may include a fill material designed to absorb a force (or forces) and/or provide a counterforce. The fill material may include several types of designs, including a honeycomb design, as a non-limiting example. Further, in order to provide a robust counterforce against forces exerted in a direction toward the cargo (to be protected by the force bearing feature), the fill material may include a longitudinal portion positioned between the cargo and the force. The term "longitudinal" as used throughout this detailed description and in the claims refers to a direction extending a length or major axis of a component. For example, the longitudinal portion of the fill material may include a lengthwise, end-to-end dimension. Further, the longitudinal portion of the fill material may be positioned inline, or parallel, with respect to the force.

Due in part to the force bearing features engaging the cargo and due to the force bearing features being positioned at opposing ends of the base feature, when the force bearing features engage the cargo, the packaging apparatus may also include a space, or void, between the base feature and the cargo. The space may be defined in part by the size of the force bearing features. The space may allow the base feature to bend in response to a force from an object while still supporting a separation between the cargo and the object. Also, when the packaging apparatus is not in use, the space may also provide additional advantages. For example, the space may allow the packaging apparatus to collapse by bending or folding the base feature at several locations, such as the fold regions, which may position the force bearing features closer to one another, thereby reducing the overall footprint of the packaging apparatus. The reduced footprint of the packaging apparatus may allow for additional storage of cargo, for example, as the space occupied by the packaging apparatus is significantly less as compared to when the base feature is fully extended.

The force bearing features may be adhered to the base feature at or near a fold region (or fold regions) of the base feature. However, the force bearing features may be adhered at locations of the base feature other than the fold regions to limit rotation of the force bearing features. The limited rotation of the force bearing features by the base feature causes the force bearing features to align with the base feature in a desired manner.

Also, the packaging apparatus may include multiple base feature to provide additional stability. In some cases, the base features include regions removed, or cut out, in order improve visibility when aligning the packaging apparatus with respect to the cargo.

These and other embodiments are discussed below with reference to FIGS. 1-28. However, those skilled in the art will readily appreciate that the detailed description given herein with respect to these Figures is for explanatory purposes only and should not be construed as limiting.

FIG. 1 illustrates an isometric view of a packaging apparatus 100, in accordance with the described embodiments. The packaging apparatus 100 refers to a space-filling apparatus designed to engage an item or items (not shown) in order to protect the item by absorbing an external force (or forces) that would otherwise be exerted directly to the item. In this regard, the packaging apparatus 100 may include a first force bearing feature 102 and a second force bearing feature 104, both of which may be designed to engage the item to be protected. The first force bearing feature 102 and the second force bearing feature 104 may be secured with a base feature 106. As shown, the base feature 106 may support the first force bearing feature 102 and the second force bearing feature 104 such that the first force bearing feature 102 and the second force bearing feature 104 align in a column-like manner. However, other alignments are possible. Also, both the first force bearing feature 102 and the second force bearing feature 104 may include a fill material (not shown) designed to absorb and/or provide a counterforce to a force or forces applied to the packaging apparatus 100. This will be discussed below.

As shown, the first force bearing feature 102 and the second force bearing feature 104 may extend to, or approximately to, opposing edges (top and bottom edges, as shown) of the base feature 106. Also, the base feature 106 may include a dimension 110 in a widthwise direction that is similar to a dimension of the item (not) shown to be protected by the packaging apparatus 100. This may allow the packaging apparatus 100 to provide end-to-end covering of the item. However, the dimension 110 may vary. Also, the base feature 106 may include several folds, or fold regions (shown not labeled), and will be discussed in further detail below. Also, in some embodiments, the features described for the packaging apparatus 100 include a single ply paper or raw craft paper formed from minimal processing, as compared to corrugated paper. This allows the packaging apparatus 100 to be made from relatively inexpensive materials and reduce the overall manufacturing.

Figure 2:
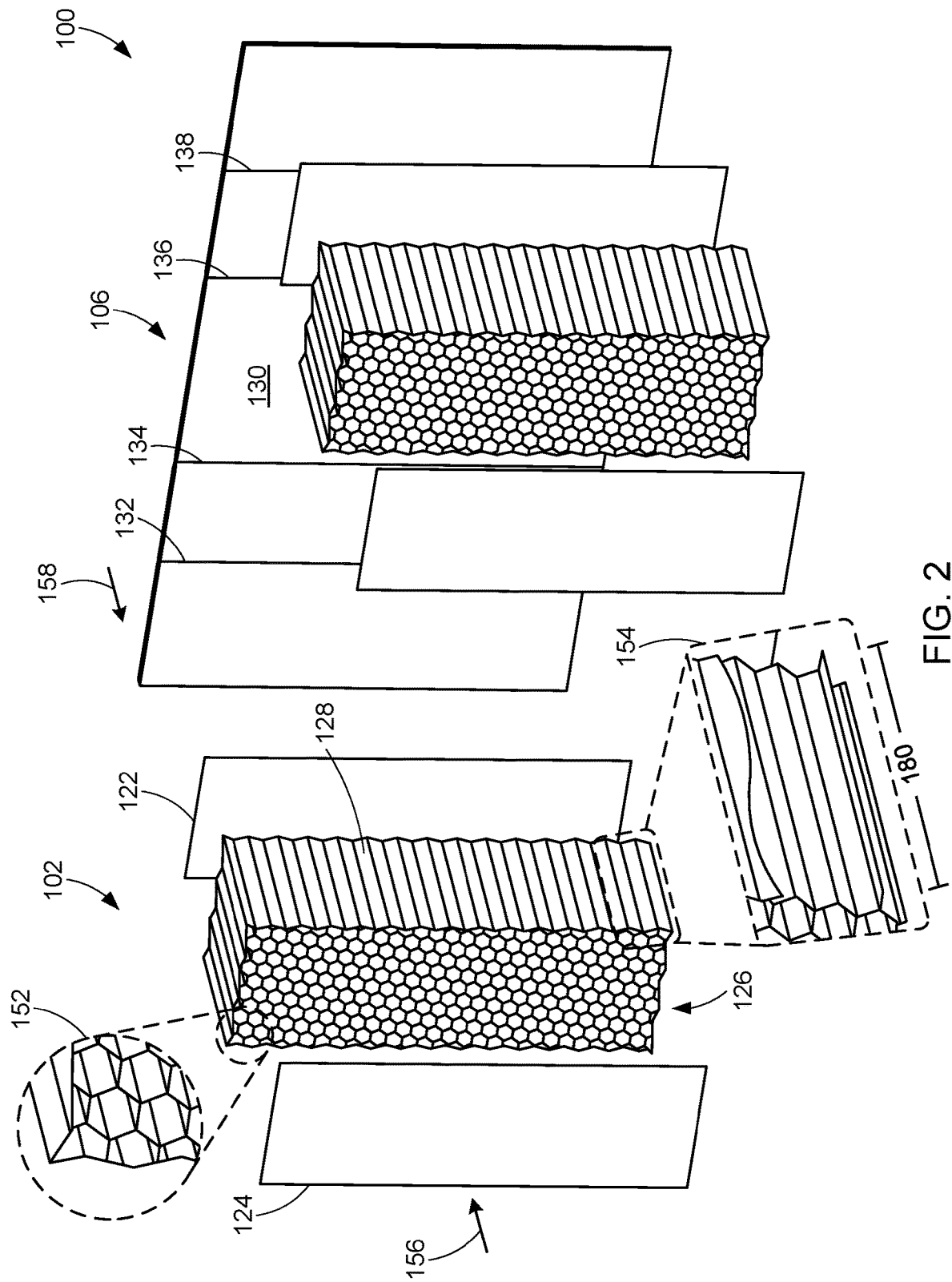
FIG. 2 illustrates an exploded view of the packaging apparatus shown in FIG. 1.

FIG. 2 illustrates an exploded view of the packaging apparatus 100 shown in FIG. 1. As shown, the first force bearing feature 102 may include a first surface feature 122 and a second surface feature 124 (opposite the first surface feature 122), with the first surface feature 122 and the second surface feature 124 combining to cover a fill material 126. The first surface feature 122 may engage and secure with the base feature 106 as well as a first end of the fill material 126 to secure the first force bearing feature 102 with the base feature 106. Securing means may include an adhesive (not shown) on both sides of the first surface feature 122. The second surface feature 124 may cover a second opposing end of the fill material 126 in a similar manner as that of the first surface feature 122. The second surface feature 124 may also define an exterior surface of the packaging apparatus 100 to engage an item (not shown) to be protected by the packaging apparatus 100. However, it should be noted that the first surface feature 122 and the second surface feature 124 may be optional. Also, as shown in FIG. 2, the fill material 126 may include a cover 128 that wraps around the fill material 126 in remaining locations of the fill material 126, that is, in location other than those covered by the first surface feature 122 and the second surface feature 124.

As shown in a first enlarged view 152, the fill material 126 may include a honeycomb configuration having several adjacent cell structures. However, other configurations and cell structures are possible. The fill material 126 may provide the first force bearing feature 102 with a robust design that absorbs and/or counteracts a force (or forces) in first direction (denoted by a first arrow 156) and a second direction (denoted by a second arrow 158). In this regard, a second enlarged view 154 shows a partial cross sectional area of the fill material 126, with the cover 128 partially removed, showing the cell structures of the fill material 126 extending to opposite ends of the fill material 126. The end-to-end dimension may be associated with a longitudinal portion 180 of the fill material 126. Accordingly, the fill material 126 may include a cell structure having a longitudinal or major dimension inline, or parallel, with the depicted forces acting in the first and second directions denoted by the first arrow 156 and the second arrow 158, respectively. Also, the cell structure of the fill material 126 may be interconnected and may allow the first force bearing feature 102 to distribute a force or forces acting on the first force bearing feature 102. For example, a force received at one location of the first force bearing feature 102 may be distributed to other locations of the first force bearing feature 102 by way of the fill material 126. Although the various structural components and features shown in FIG. 2 are shown for the first force bearing feature 102, the second force bearing feature 104 may include any structural component(s) and/or feature(s) previously described for the first force bearing feature 102.

The base feature 106 may include a central portion 130 defined by a region between locations of the base feature 106 that receive the first force bearing feature 102 and the second force bearing feature 104. Also, the base feature 106 may include several fold regions, or folds, extending in a direction parallel, or approximately parallel, with respect to the force bearing features. For example, the base feature 106 may include a first fold region 132, a second fold region 134, a third fold region 136, and a fourth fold region 138. The functions and advantages of the fold regions will be described below.

Figure 3:
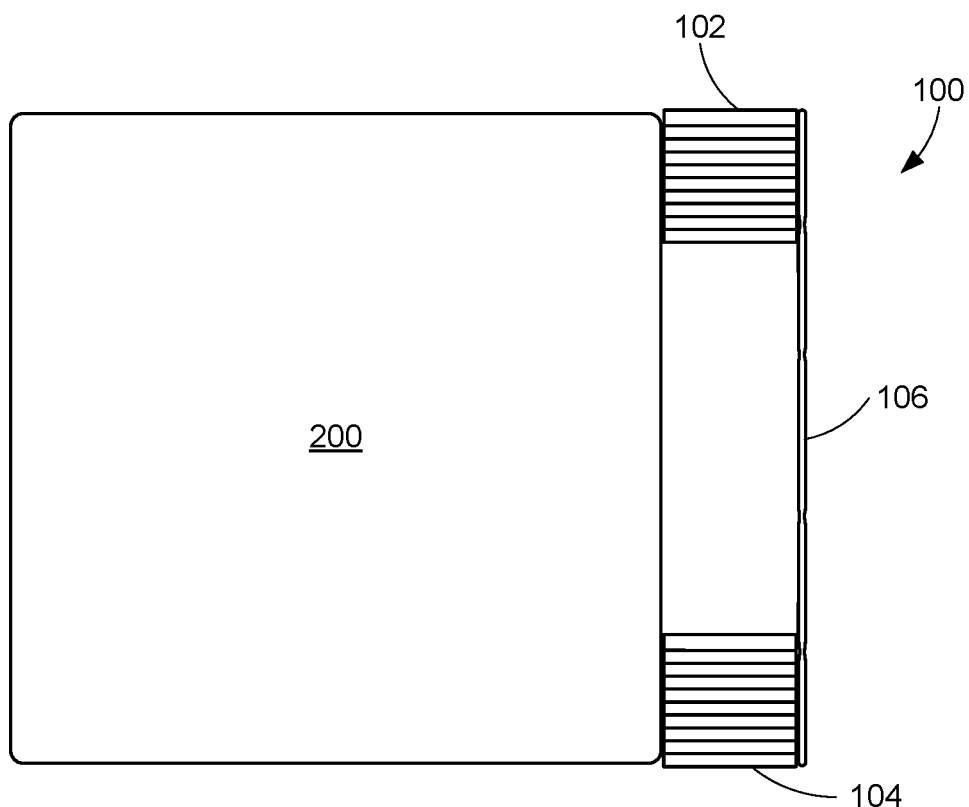
FIG. 3 illustrates a plan view of the packaging apparatus engaging an item, in accordance with the described embodiments.

FIG. 3 illustrates a plan view of the packaging apparatus 100 engaging an item 200, in accordance with the described embodiments. The item 200 may include various items, including, but not limited to, a shipping cart carrying goods or cargo, or a box containing goods or cargo, or the like. Also, the item 200 may be replaced by two or more items. As shown, the first force bearing feature 102 and the second force bearing feature 104 may engage the item 200. As shown in FIG. 3, the packaging apparatus 100 may a size such that that a dimension of the base feature 106 is similar, or at least substantially similar, to that of the item 200. In this manner, when the base feature 106 is unfolded, or substantially unfolded, the packaging apparatus 100 is in an extended configuration, and the first force bearing feature 102 and the second force bearing feature 104 align with the edges of the item, as shown in FIG. 3. In some embodiments (not shown), the base feature 106 includes a dimension smaller than that of the item 200, and the first force bearing feature 102 and the second force bearing feature 104 are positioned within the edges of the item 200. Also, although not shown, each of the first force bearing feature 102 and the second force bearing feature 104 may be designed to protect an item by limiting or preventing movement of the item. For example, the first force bearing feature 102 may engage a first item (not shown) and the second force bearing feature 104 may engage a second item (not shown) to protect the first item and the second item, respectively. Moreover, the first force bearing feature 102 and the second force bearing feature 104 can be positioned on the base feature 106 such that the first force bearing feature 102 and the second force bearing feature 104 are centered with respect to the first item and the second item, respectively.

Figure 4:
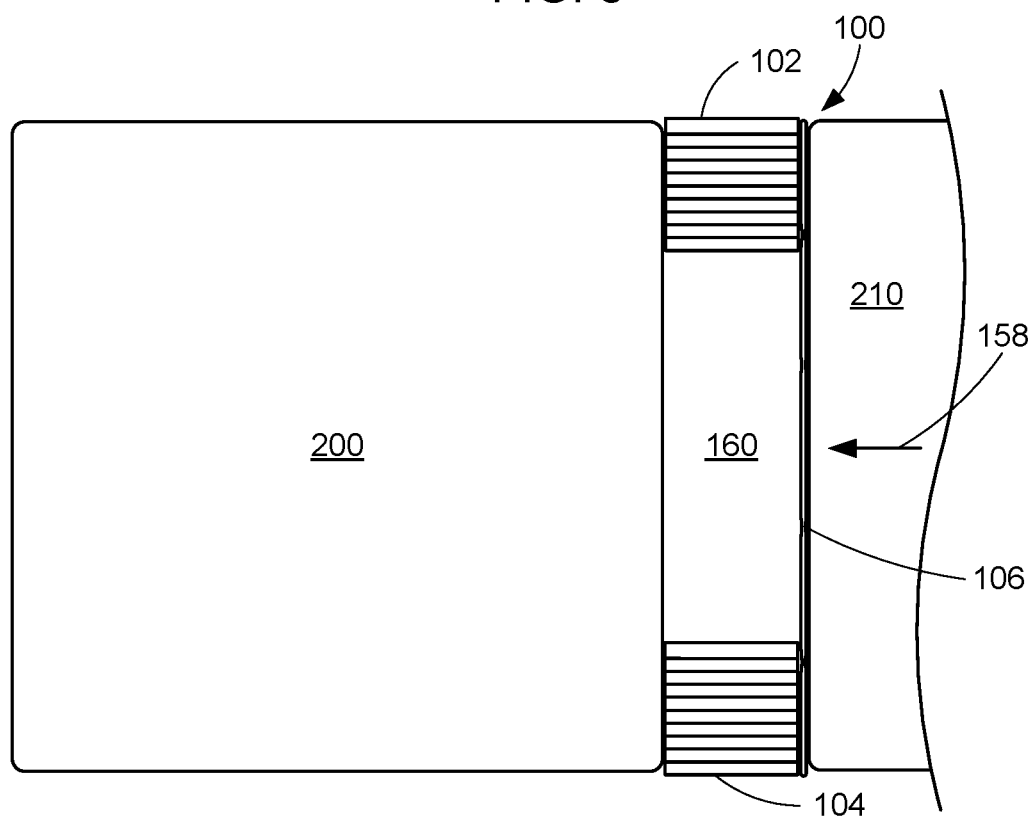
FIG. 4 illustrates a plan view of the packaging apparatus shown in FIG. 3, showing the packaging apparatus engaged with a second item.

FIG. 4 illustrates a plan view of the packaging apparatus 100 shown in FIG. 3, showing the packaging apparatus 100 engaged with a second item 210 (partially shown). The second item 210 may also be cargo or goods, similar to that of the item 200. In an exemplary the packaging apparatus 100 may be used in a trailer to provide a protective barrier from a force exerted on the item 200 by an object, such as the second item 210, when the object moves in a direction toward the item 200. As shown, the fill material (previously described) of the first force bearing feature 102 and the second force bearing feature 104 may allow the packaging apparatus 100 to withstand or counteract a force (in a direction of the second arrow 158) exerted by the second item 210. Also, as shown in FIG. 4, when the first force bearing feature 102 and the second force bearing feature 104 engage the item 200, the first force bearing feature 102, the second force bearing feature 104, and the base feature 106 define a space 160 (void of structural components of the packaging apparatus 100) that may provide additional separation between the second item 210 and the item 200. Also, although not shown, the packaging apparatus 100 may also provide a counterforce in a direction opposite that of the second arrow 158, and accordingly, may provide protection to the second item 210 against a force exerted by the item 200, should the item 200 move in a direction toward the second item 210.

In some cases, the packaging apparatus 100 may include a height and width of several feet. For example, the height of the packaging apparatus 100 may be approximately in the range of 72 to 100 inches, and the width (such as the dimension 110 of the base feature 106 shown in FIG. 1) may be approximately in the range of 36 to 72 inches. These relatively large dimensions may cause the packaging apparatus 100 to occupy an undesirable amount of space, particularly when the packaging apparatus 100 is not in use and stored in a trailer or other hauling enclosure having limited space. It should be noted that the height and width may vary in other embodiments.

Figure 5:
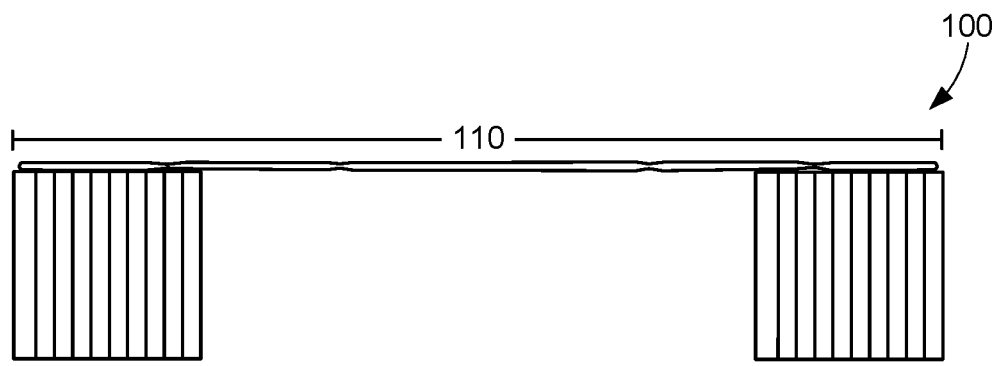
FIG. 5 illustrates a plan view of the packaging apparatus in an extended configuration, in accordance with the described embodiments.
Figure 6:
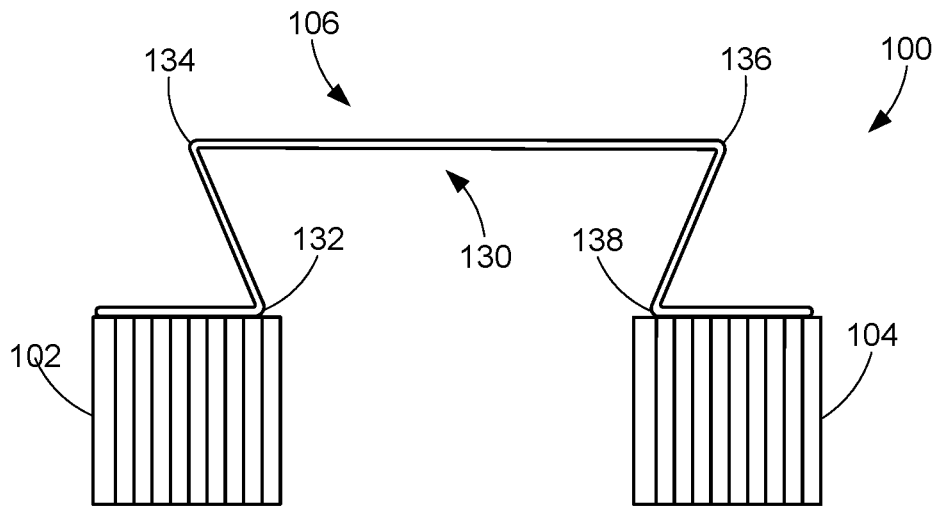
FIG. 6 illustrates a plan view of the packaging apparatus shown in FIG. 5, further showing the packaging apparatus in a partially folded configuration.
Figure 7:
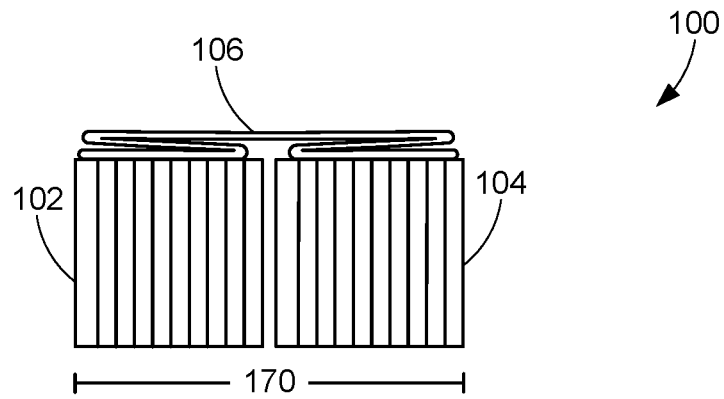
FIG. 7 illustrates a plan view of the packaging apparatus shown in FIG. 6, further showing the packaging apparatus in collapsible configuration.

However, the packaging apparatus 100 may be designed to reduce the overall spaced occupied. For example, FIGS. 5-7 show the packaging apparatus 100 reducing from an extended configuration to a collapsible configuration. The collapsible configuration may be desirable when storing or shipping the packaging apparatus 100.

FIG. 5 illustrates a plan view of the packaging apparatus 100 in an extended configuration, in accordance with the described embodiments. As previously shown, the extended configuration may be used to protect an item or items. The extended configuration may include a widthwise dimension characterized by the dimension 110 (also shown in FIG. 1). FIG. 6 illustrates a plan view of the packaging apparatus 100 shown in FIG. 5, further showing the packaging apparatus 100 in a partially folded configuration. As shown, the first fold region 132 and the second fold region 134 allow the base feature 106 to bend, which may cause the first force bearing feature 102 to move in a direction toward the central portion 130. Similarly, the third fold region 136 and the fourth fold region 138 allow the base feature 106 to bend, which may cause the second force bearing feature 104 to move in a direction toward the central portion 130.

FIG. 7 illustrates a plan view of the packaging apparatus 100 shown in FIG. 6, further showing the packaging apparatus 100 in collapsible configuration. As shown, based upon continued bending or folding of the aforementioned fold regions, the base feature 106 continues to fold until the first force bearing feature 102 and the second force bearing feature 104 are positioned at the central portion 130 (shown in FIG. 6). Also, the packaging apparatus 100 may be reduced from the dimension 110 (shown in FIG. 5) to a second dimension 170 less than the dimension 110, with the second dimension 170 defined, or at least approximately defined, by the dimensions (widthwise dimension) of the first force bearing feature 102 and the second force bearing feature 104. In some embodiments, the second dimension 170 is one-third, or approximately one-third, the length as that of the dimension 110. Accordingly, the collapsible configuration may reduce the packaging apparatus 100 by two-thirds, or approximately two-thirds, as compared to the extended configuration (shown in FIG. 5). Although not shown, in some embodiments, the first force bearing feature 102 engages the second force bearing feature 104 in the collapsible configuration to define the second dimension 170. Also, while the packaging apparatus 100 was previously shown in use in the extended configuration (see FIG. 4), the packaging apparatus 100 may be used in similar applications in the collapsible configuration for relatively smaller items.

Figure 8:
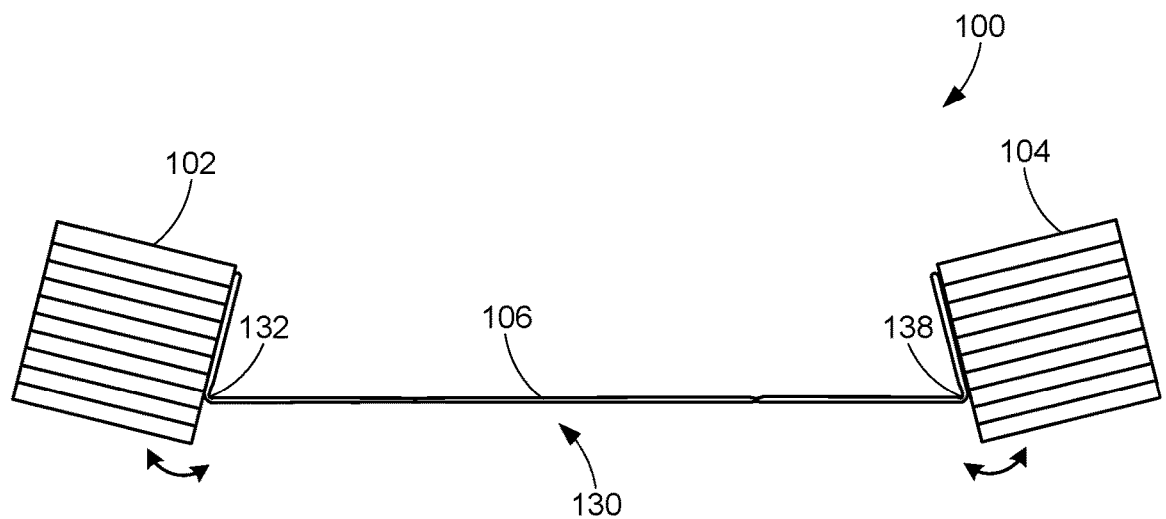
FIG. 8 illustrates a plan view of the packaging apparatus, showing the force bearing features rotating about their respective fold regions of the base feature.

FIG. 8 illustrates a plan view of the packaging apparatus 100, showing the force bearing features rotating about their respective fold regions of the base feature 106. For example, the first fold region 132 may allow the first force bearing feature 102 to pivot or rotate with respect to the central portion 130, and the fourth fold region 138 may allow the second force bearing feature 104 to pivot or rotate with respect to the central portion 130.

Figure 9:
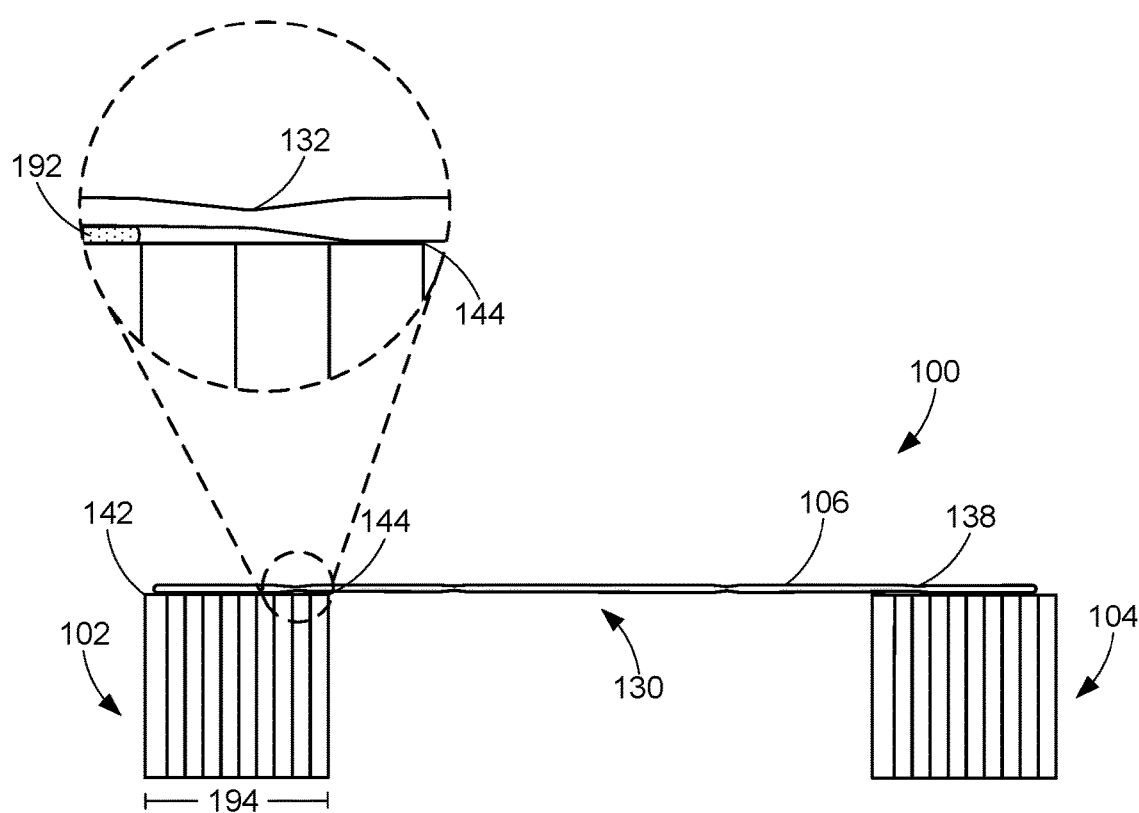
FIG. 9 illustrates a plan view of the packaging apparatus shown in FIG. 8, showing the force bearing features aligned with the base feature.

However, in order to align the first force bearing feature 102 and the second force bearing feature 104 in a desired manner (such as the extended configuration shown in FIG. 5), the central portion 130, along with at least some of the fold regions previously described, may provide the packaging apparatus 100 with an alignment means for the first force bearing feature 102 and the second force bearing feature 104. For example, FIG. 9 illustrates a plan view of the packaging apparatus 100 shown in FIG. 8, showing the force bearing features aligned with the base feature 106. As shown in the enlarged view, the first force bearing feature 102 may be secured with the base feature 106 by an adhesive layer 192. Further, the adhesive layer 192 may extend across the surfaces associated with an interface region between the first force bearing feature 102 and the base feature 106 in locations other than the first fold region 132, thereby allowing the first force bearing feature 102 to freely rotate, about the first fold region 132, with respect to the central portion 130 of the base feature 106.

Also, FIG. 9 shows the first force bearing feature 102 having a dimension 194, such as a widthwise dimension, extending from a first edge 142 of the first force bearing feature 102 to a second edge 144 of the first force bearing feature 102, with the first edge 142 and the second edge 144 being at opposing ends of the first force bearing feature 102. Moreover, the first fold region 132 may be located at the base feature 106 in a location corresponding to a location between the first edge 142 and second edge 144. In this manner, the base feature 106, and in particular, the central portion 130, may limit the rotation of the first force bearing feature 102 when the first force bearing feature 102 engages the central portion 130, as shown in the enlarged view. When the first force bearing feature 102 engages the central portion 130, the central portion 130 may limit rotational movement about the first fold region 132 in a counterclockwise motion. Although the various structural components and features shown in FIG. 9 are shown for the first force bearing feature 102, the second force bearing feature 104 may include any structural component(s) and feature(s) previously described for the first force bearing feature 102. Accordingly, when the second force bearing feature 104 engages the central portion 130, the central portion 130 may limit rotational movement about the fourth fold region 138 in a clockwise motion.

Figure 10:
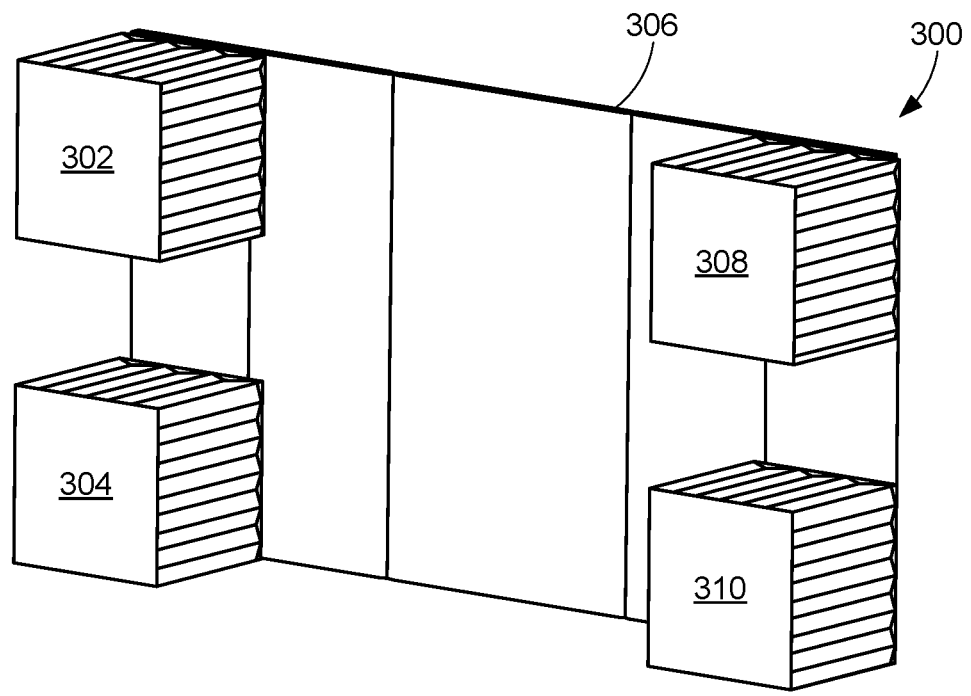
FIG. 10 illustrates a plan view of an alternate embodiment of a packaging apparatus having discontinuous force bearing features, in accordance with the described embodiments.

The force bearing features may vary to achieve different objectives. For example, FIG. 10 illustrates a plan view of an alternate embodiment of a packaging apparatus 300 having discontinuous force bearing features, in accordance with the described embodiments. As shown, the packaging apparatus 300 may include a first force bearing feature 302 and a second force bearing feature 304 at one end of a base feature 306, and a third force bearing feature 308 and a fourth force bearing feature 310 at an opposing end of a base feature 306. This may allow for an item (not shown) to extend into a space between force bearing features at one or both ends. For example, the item may be a feature extending into a space between the first force bearing feature 302 and the second force bearing feature 304, and/or between the third force bearing feature 308 and the fourth force bearing feature 310.

Figure 11:
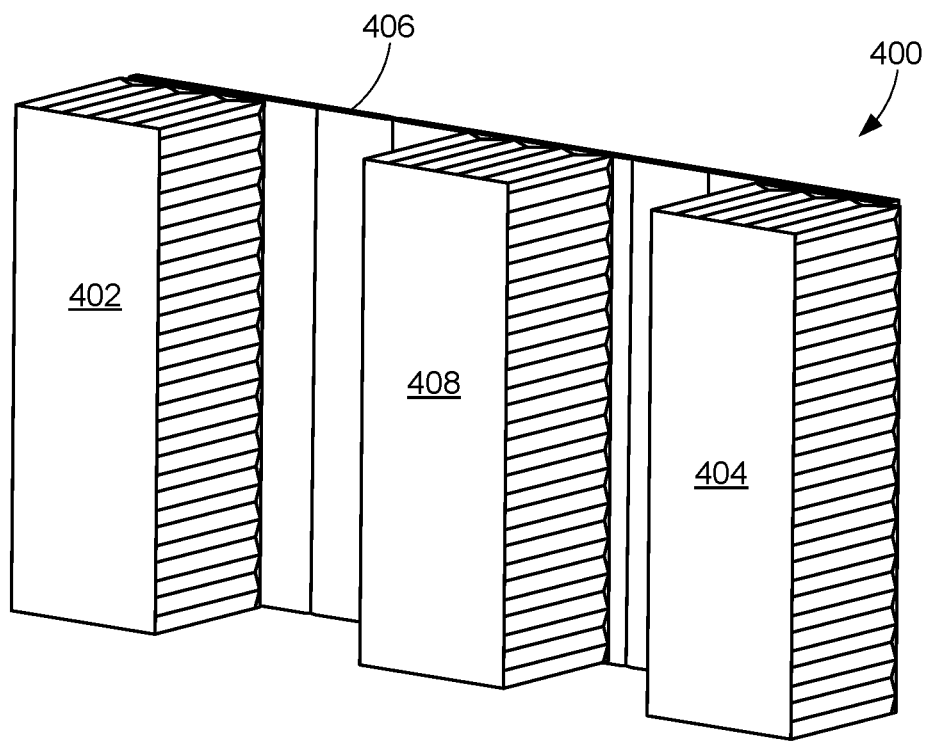
FIG. 11 illustrates a plan view of an alternate embodiment of a packaging apparatus having an additional force bearing features, in accordance with the described embodiments.

FIG. 11 illustrates a plan view of an alternate embodiment of a packaging apparatus 400 having an additional force bearing features, in accordance with the described embodiments. As shown, the packaging apparatus 400 may include a first force bearing feature 402 and a second force bearing feature 404 at opposing ends of a base feature 406, and a third force bearing feature 408 between the first force bearing feature 402 and the second force bearing feature 404. This may provide for additional counterforce against a force or force acting in a direction toward an item (not) protected by the packaging apparatus 400. Although not shown, the force bearing features in FIGS. 10 and 11 may include a fill material similar to a manner previously described for a fill material.

Figure 12:
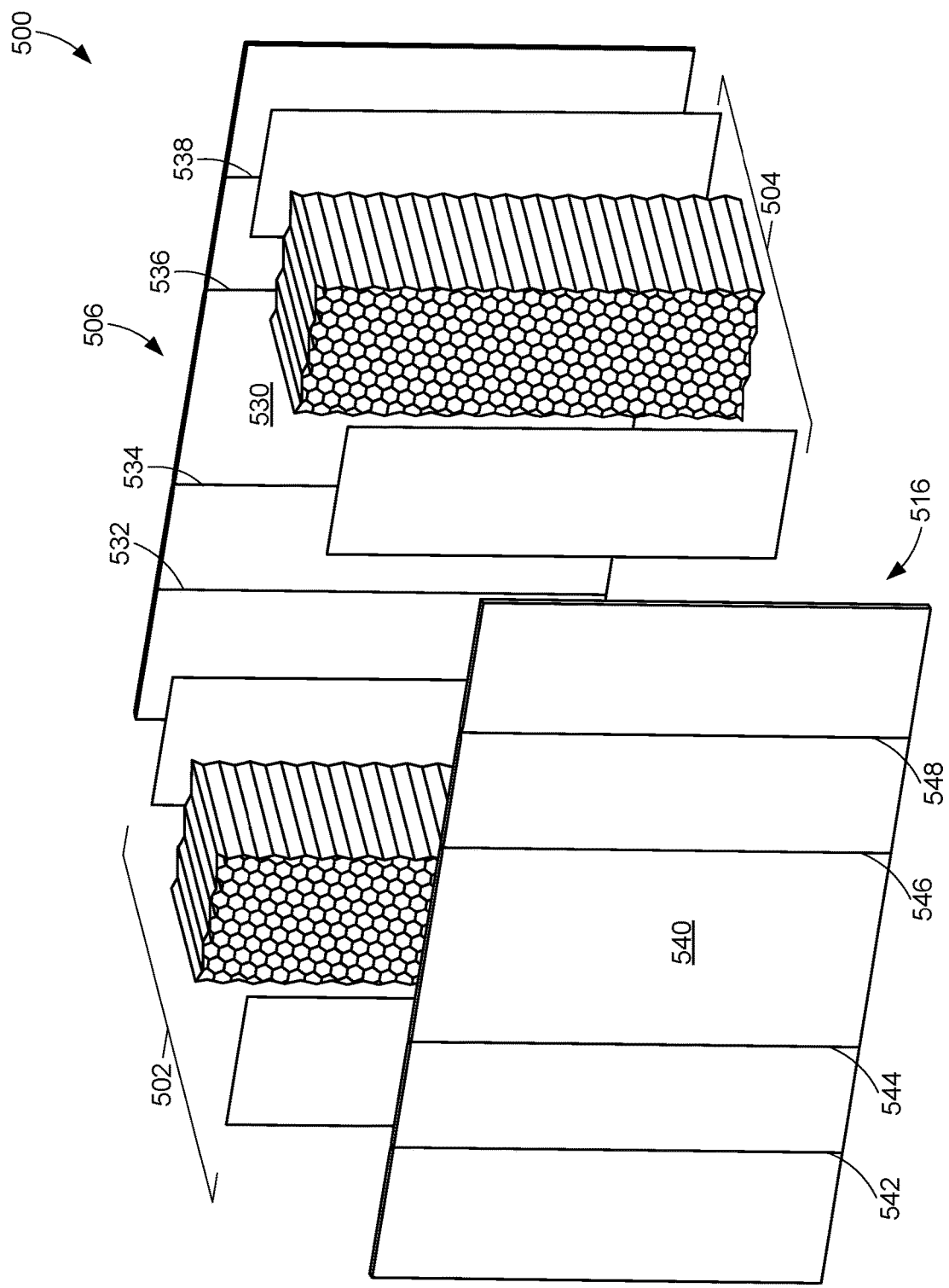
FIG. 12 an exploded view of an alternative embodiment of a packaging apparatus, showing the packaging apparatus having multiple base features, in accordance with the described embodiments.

FIG. 12 an exploded view of an alternative embodiment of a packaging apparatus 500, showing the packaging apparatus 500 having multiple base features, in accordance with the described embodiments. As shown, the packaging apparatus 500 may include several features previously described for a packaging apparatus, such as the packaging apparatus 100 (shown in FIG. 2). For example, the packaging apparatus 500 may include a first force bearing feature 502 and a second force bearing feature 504, in accordance with the described embodiments. However, as shown in FIG. 12, the packaging apparatus 500 may include a first base feature 506 and a second base feature 516. The packaging apparatus 500 may assemble in a manner such that the first base feature 506 and the second base feature 516 cover, or at least substantially covers, the first force bearing feature 502 and the second force bearing feature 504.

The second base feature 516 may provide additional support and stability to the packaging apparatus 500. For example, the first force bearing feature 502 may be inclined to rock or tilt relative to the second force bearing feature 504, particularly when the first force bearing feature 502 is relatively tall. However, the second base feature 516 may support at least some of the weight of the first force bearing feature 502 to counter unwanted movement (such as rocking or twisting) of first force bearing feature 502. Also, the first base feature 506 and the second base feature 516 may include features previously described for a base feature. For example, as shown in FIG. 12, the first base feature 506 may include a central portion 530 between the first force bearing feature 502 and the second force bearing feature. The second base feature 516 may also include a central portion 540. Also, the first base feature 506 may include a first fold region 532, a second fold region 534, a third fold region 536, and a fourth fold region 538. The second base feature 516 may also include a first fold region 542, a second fold region 544, a third fold region 546, and a fourth fold region 548.

Figure 13:
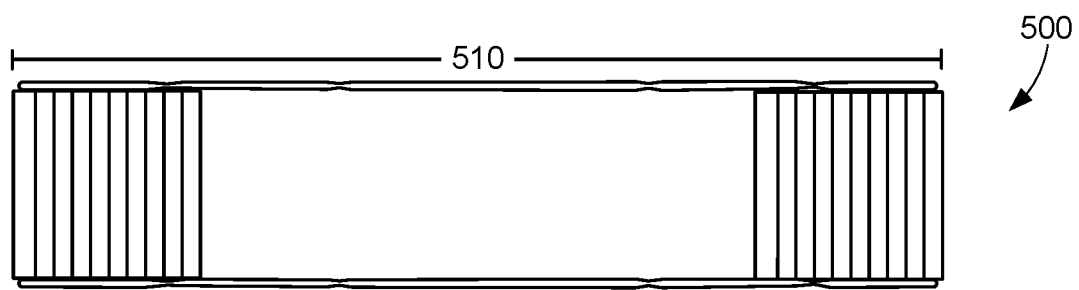
FIG. 13 illustrates a plan view of the packaging apparatus shown in FIG. 12, showing the packaging apparatus in an extended configuration, in accordance with the described embodiments.
Figure 14:
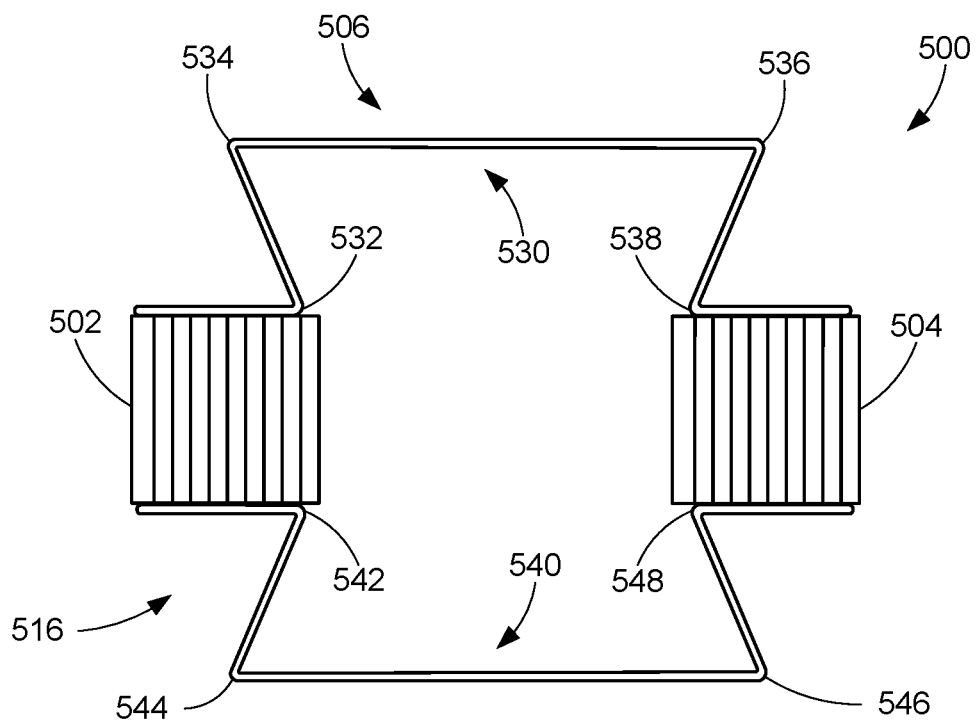
FIG. 14 illustrates a plan view of the packaging apparatus shown in FIG. 13, further showing the packaging apparatus in a partially folded configuration.

The fold regions of the first base feature 506 and the second base feature 516 may allow the packaging apparatus 500 to expand or collapse. For example, FIG. 13 illustrates a plan view of the packaging apparatus 500 shown in FIG. 12, showing the packaging apparatus 500 in an extended configuration, in accordance with the described embodiments. The extended configuration may include a widthwise dimension of the packaging apparatus 500 and characterized by the dimension 510. The dimension 510 may include a dimension similar to that of an item (not shown) to be protected by the packaging apparatus 500. However, this is optional. FIG. 14 illustrates a plan view of the packaging apparatus 500 shown in FIG. 13, further showing the packaging apparatus 500 in a partially folded configuration. As shown, the first fold region 532 and the second fold region 534 may allow the first base feature 506 to bend. Also, the first fold region 542 and the second fold region 544 may allow the second base feature 516 to bend. The bending of the aforementioned fold regions may cause the first force bearing feature 502 to move in a direction toward the central portion 530 of the first base feature 506 as well as a direction toward the central portion 540 of the second base feature 516.

In a similar manner, the third fold region 536 and the fourth fold region 538 of the first base feature 506 may allow the first base feature 506 to bend. Also, the third fold region 546 and the fourth fold region 548 of the second base feature 516 may allow the second base feature 516 to bend. The bending of the aforementioned fold regions may cause the second force bearing feature 504 to move in a direction toward the central portion 530 of the first base feature 506 as well as a direction toward the central portion 540 of the second base feature 516.

Figure 15:
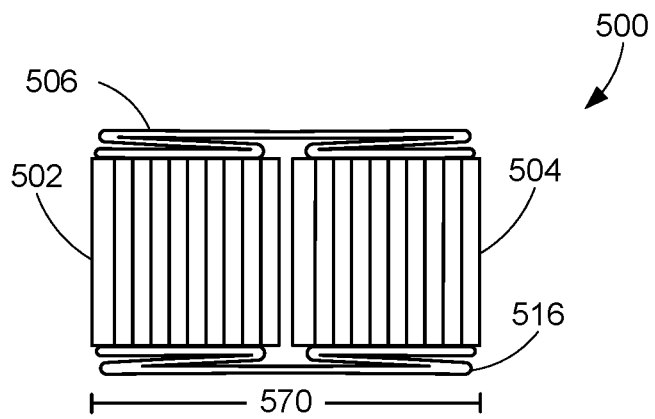
FIG. 15 illustrates a plan view of the packaging apparatus shown in FIG. 14, further showing the packaging apparatus in collapsible configuration.

FIG. 15 illustrates a plan view of the packaging apparatus shown in FIG. 14, further showing the packaging apparatus 500 in collapsible configuration. As shown, based upon continued bending or folding of the aforementioned fold regions, the first base feature 506 and the second base feature 516 may continue to fold until the first force bearing feature 502 and the second force bearing feature 504 are positioned at the central portion 530 and the central portion 540 (labeled in FIG. 14) of their respective base features. Also, the packaging apparatus 500 may be reduced from the dimension 510 (shown in FIG. 13) to a second dimension 570 less than the dimension 510, with the second dimension 570 defined, or at least approximately defined, by the dimensions (widthwise dimension) of the first force bearing feature 502 and the second force bearing feature 504. Although not shown, in some embodiments, the first force bearing feature 502 engages the second force bearing feature 504 in the collapsible configuration to define the second dimension 570. Also, similar to a prior embodiment, the collapsible configuration may represent, in one dimension of the packaging apparatus 500, a reduction in size by two-thirds, or approximately two-thirds.

Figure 16:
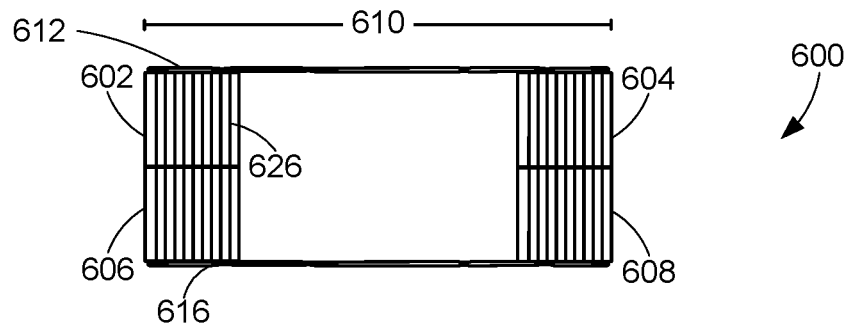
FIG. 16 illustrates a plan view an alternate embodiment of a packaging apparatus, showing the packaging apparatus having a "dual" packaging apparatus configuration, in accordance with the described embodiments.

FIG. 16 illustrates a plan view an alternate embodiment of a packaging apparatus 600, showing the packaging apparatus 600 having a "dual" packaging apparatus configuration, in accordance with the described embodiments. The dual configuration of the packaging apparatus 600, associated with two stacked force bearing features, may provide additional protection to an item (not shown). The extended configuration may include a widthwise dimension characterized by the dimension 610. The dimension 610 may include a dimension similar to that of an item (not shown) to be protected by the packaging apparatus. As shown, the packaging apparatus 600 may include a first force bearing feature 602 and a second force bearing feature 604 secured with a first base feature 612. Further, the packaging apparatus 600 may include a third force bearing feature 606 and a fourth force bearing feature 608 secured with a second base feature 616. The first force bearing feature 602 and the second force bearing feature 604 may be secured with the third force bearing feature 606 and the fourth force bearing feature 608, respectively. Securing means may include an adhesive, as a non-limiting example.

Also, in accordance with the described embodiments, the force bearing features may include a fill material in a manner previously described. For example, the first force bearing feature 602 may include a fill material 626 having a cell structure previously described extending end-to-end along the fill material 626. In this regard, the packaging apparatus 600 may be positioned against an item (not shown) to be protected by the packaging apparatus 600 such that a longitudinal portion of the fill material 626 is inline, or parallel, with the forces acting on the packaging apparatus 600, and in particular, the first force bearing feature 602. It should be noted that the second force bearing feature 604, the third force bearing feature 606, and the fourth force bearing feature 608 may include any material(s) and/or feature(s) previously described for the first force bearing feature 602.

Figure 17:
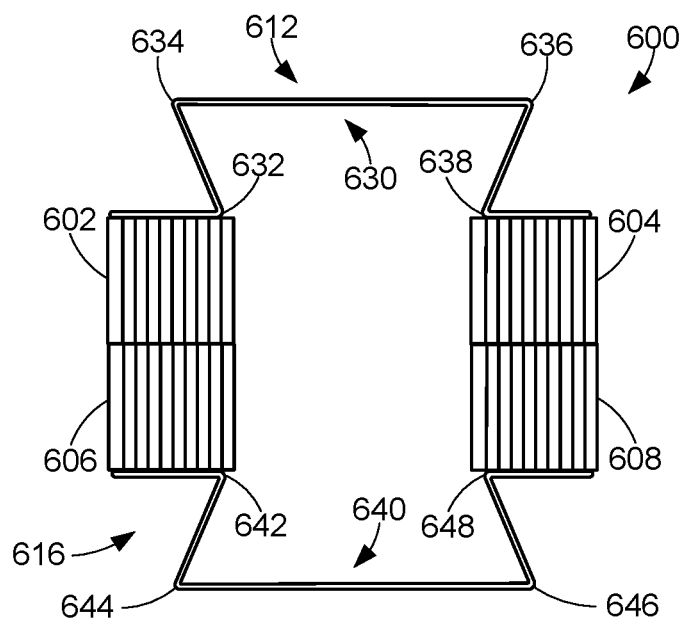
FIG. 17 illustrates a plan view of the packaging apparatus shown in FIG. 16, further showing the packaging apparatus in a partially folded configuration.

FIG. 17 illustrates a plan view of the packaging apparatus 600 shown in FIG. 16, further showing the packaging apparatus 600 in a partially folded configuration. As shown, the first fold region 632 and the second fold region 634 (of the first base feature 612) may allow the first base feature 612. Also, the first fold region 642 and the second fold region 644 (of the second base feature 616) may allow the second base feature 616 to bend. The bending of the aforementioned fold regions may cause the first force bearing feature 602 and the third force bearing feature 606 to move in a direction toward the central portion 630 of the first base feature 612 and the central portion 640 of the second base feature 616, respectively.

In a similar manner, the third fold region 636 and the fourth fold region 638 (of the first base feature 612) may allow the first base feature 612 to further bend. Also, the third fold region 646 and the fourth fold region 648 (of the second base feature 616) may allow the second base feature 616 to further bend. The bending of the aforementioned fold regions may cause the second force bearing feature 604 and the fourth force bearing feature 608 to move in a direction toward the central portion 630 of the first base feature 612 and the central portion 640 of the second base feature 616, respectively.

Figure 18:
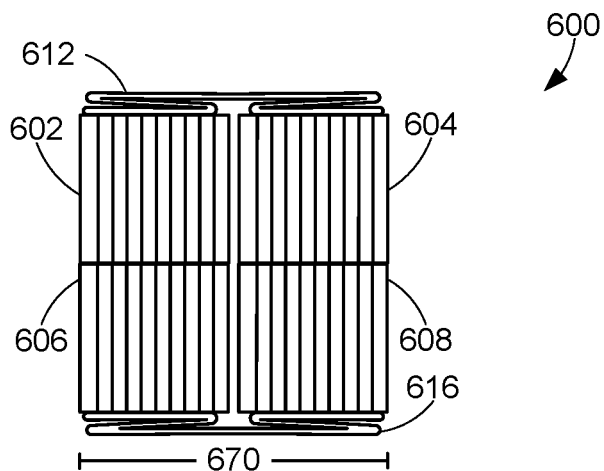
FIG. 18 illustrates a plan view of the packaging apparatus shown in FIG. 17, further showing the packaging apparatus in collapsible configuration.

FIG. 18 illustrates a plan view of the packaging apparatus shown in FIG. 17, further showing the packaging apparatus 600 in collapsible configuration. As shown, based upon continued bending or folding of the aforementioned fold regions, the first base feature 612 and the second base feature 616 may continue to fold until the first force bearing feature 602 and the second force bearing feature 604 are positioned at the central portion 630 (labeled in FIG. 17), and the third force bearing feature 606 and the fourth force bearing feature 608 are positioned at the central portion 640 (labeled in FIG. 17). Also, the packaging apparatus 600 may be reduced from the dimension 610 (shown in FIG. 16) to a second dimension 670 less than the dimension 610, with the second dimension 670 defined, or at least approximately defined, by the dimensions (widthwise dimension) of the first force bearing feature 602 and the second force bearing feature 604. Although not shown, in some embodiments, the first force bearing feature 602 engages the second force bearing feature 604, and the third force bearing feature 606 engages the fourth force bearing feature 608, in the collapsible configuration to define the second dimension 670. Also, similar to a prior embodiment, the collapsible configuration may represent, in one dimension of the packaging apparatus 600, a reduction in size by two-thirds, or approximately two-thirds.

Figure 19:
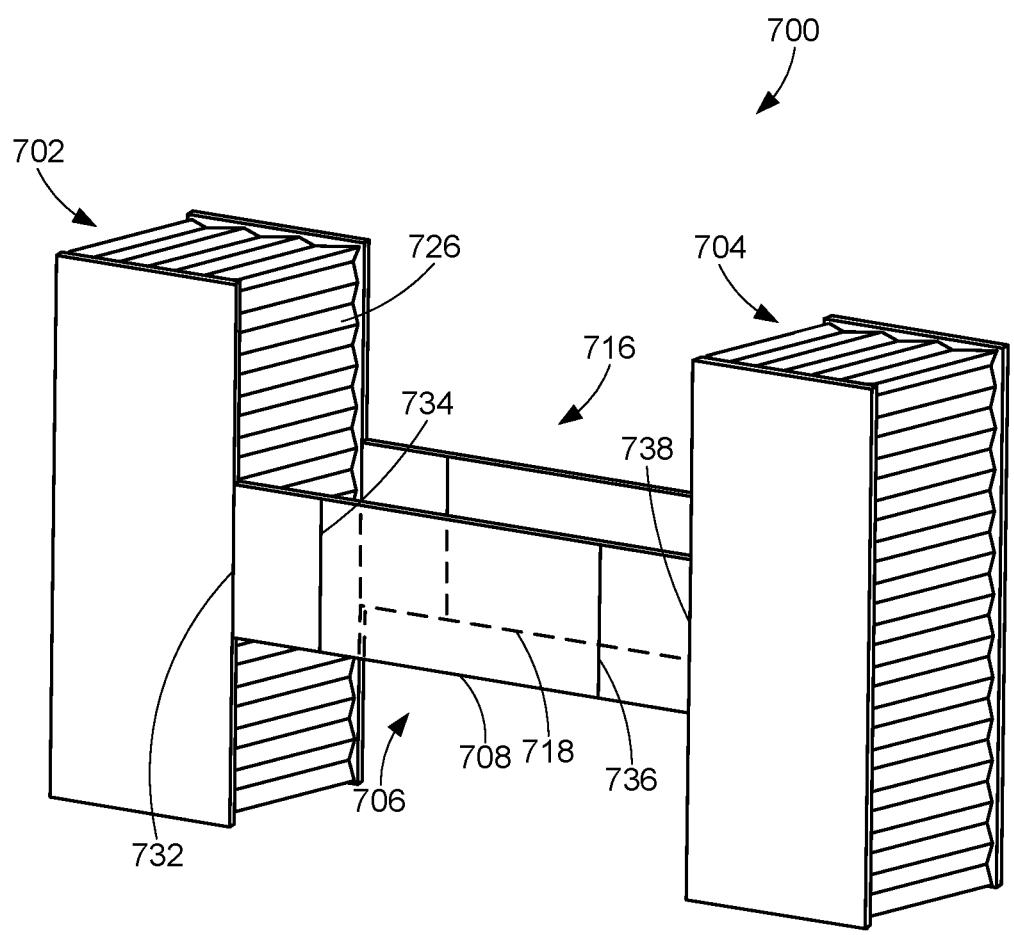
FIG. 19 illustrates an isometric view of the packaging apparatus having multiple base features, further showing portions of the base features removed, in accordance with the described embodiments.

FIG. 19 illustrates an isometric view of the packaging apparatus 700 having multiple base features, further showing portions of the base features removed, in accordance with the described embodiments. As shown, the packaging apparatus 700 may include several feature previously described for a packaging apparatus, such as the packaging apparatus 100 (shown in FIG. 2). For example, the packaging apparatus 700 may include a first force bearing feature 702 and a second force bearing feature 704, in accordance with the described embodiments. Further, the packaging apparatus 700 may include a first base feature 706 and a second base feature 716, with the first base feature 706 and the second base feature 716 covering, or at least substantially covering, the first force bearing feature 702 and the second force bearing feature 704. However, in the embodiment shown in FIG. 19, the first base feature 706 and the second base feature 716 include a shape other than a traditional four-sided shape. As shown, the first base feature 706 and the second base feature 716 include a "H-shape" design. In other words, portions of the first base feature 706 and the second base feature 716 are removed in locations between the first force bearing feature 702 and the second force bearing feature 704. Removing portions of the base feature offers several advantages. For example, the removed portions of the first base feature 706 and the second base feature 716 may define a first crossbar 708 and a second crossbar 718, respectively. The first crossbar 708 and the second crossbar 718 may be integrally formed with the remaining portions of the first base feature 706 and the second base feature 716. The first crossbar 708 and/or the second crossbar 718 may be used as a handle by a user to readily lift the packaging apparatus 700 to, for example, transport the packaging apparatus 700 to a desired location. Also, the removed portions of the first base feature 706 and the second base feature 716 allow a user to see an item (not shown) that is protected by the packaging apparatus 700, and accordingly, the removed portion may facilitate alignment of the packaging apparatus 700 with respect to the item.

Further, as shown in FIG. 19, the first base feature 706 and the second base feature 716 may include multiple fold regions. For example, the first base feature 706 may include first fold region 732, a second fold region, 734, a third fold region 736, and a fourth fold region 738. Although not labeled, the second base feature 716 may include a similar number of fold regions as that of the first base feature 706. In this regard, the packaging apparatus 700 may be configurable in an extended configuration (similar to the packaging apparatus 600 in FIG. 15), a partially folded configuration (similar to the packaging apparatus 600 in FIG. 16), and a collapsible configuration (similar to the packaging apparatus 600 in FIG. 17).

Also, in accordance with the described embodiments, the force bearing features may include a fill material in a manner previously described. For example, the first force bearing feature 702 may include a fill material 726 having a cell structure (not shown) extending end-to-end along the fill material 726. In this regard, the packaging apparatus 700 may be positioned against an item (not shown) to be protected by the packaging apparatus 700 such that a longitudinal portion of the fill material 726 is inline, or parallel, with the forces acting on the packaging apparatus 700, and in particular, the first force bearing feature 702. It should be noted that the second force bearing feature 704 may include any material(s) or feature(s) previously described for the first force bearing feature 702. Also, similar to a prior embodiment, the collapsible configuration may represent, in one dimension of the packaging apparatus 700, a reduction in size by two-thirds, or approximately two-thirds.

Figure 20:
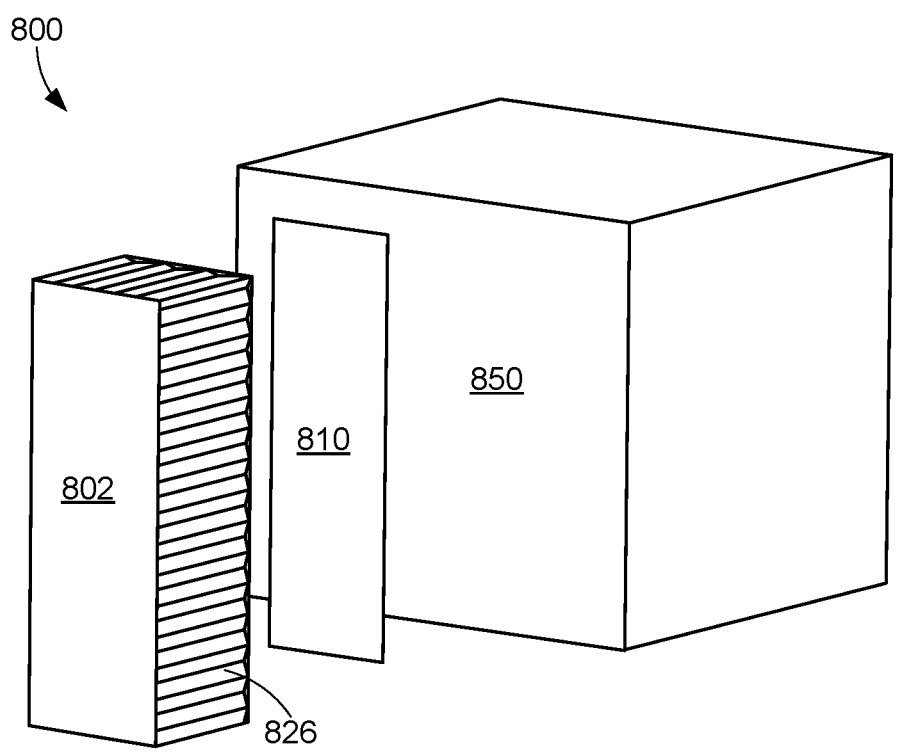
FIG. 20 illustrates an exploded view of an alternate embodiment of a packaging apparatus, showing the packaging apparatus including a force bearing feature and means for securing the force bearing feature with an item, in accordance with the described embodiments.

FIG. 20 illustrates an exploded view of an alternate embodiment of a packaging apparatus 800, showing the packaging apparatus 800 including a force bearing feature 802 and means for securing the force bearing feature 802 with an item 850, in accordance with the described embodiments. As shown, the means for securing the force bearing feature 802 with the item 850 (to be protected by the force bearing feature 802) may include an adhesive layer 810. In some embodiments, the adhesive layer 810 includes a two-sided adhesive tape designed to adhesively secure with both the force bearing feature 802 and the item 850. In this manner, the packaging apparatus 800 may include a modular design in that the force bearing feature 802 fastens to the item 850 to ensure the force bearing feature 802 is in a desired location relative to the item. Also, in accordance with the described embodiments, the force bearing features may include a fill material in a manner previously described. For example, the force bearing feature 802 may include a fill material 826 having a cell structure (not shown) extending end-to-end along the fill material 826. In this regard, the packaging apparatus 800 may be positioned against an item (not shown) to be protected by the packaging apparatus 800 such that a longitudinal portion of the fill material 826 is inline, or parallel, with the forces acting on the packaging apparatus 800, and in particular, the force bearing feature 802.

Figure 21:
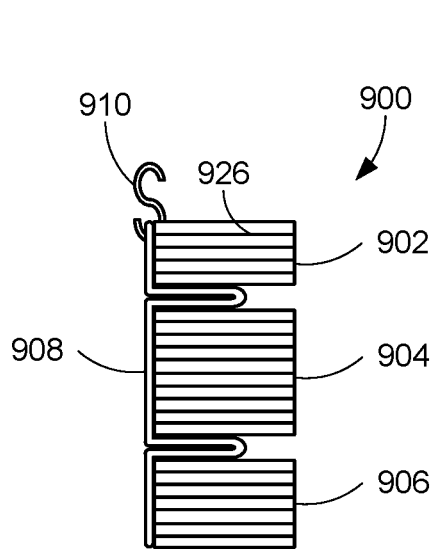
FIG. 21 illustrates a side view of an alternate embodiment of a packaging apparatus, showing the packing apparatus in a collapsible configuration, in accordance with the described embodiments.

The collapsible features of a packaging apparatus may vary in different embodiments. For example, FIG. 21 illustrates a side view of an alternate embodiment of a packaging apparatus 900, showing the packing apparatus in a collapsible configuration, in accordance with the described embodiments. As shown, the packaging apparatus 900 may include multiple force bearing features, such as a first force bearing feature 902, a second force bearing feature 904, and third force bearing feature 906, all of which may be secured with a base feature 908. The base feature 908 may include various fold regions that allow the packaging apparatus 900 to fold at the fold regions of the base feature 908 and collapse to a reduced size and shape. Also, in accordance with the described embodiments, the force bearing features may include a fill material in a manner previously described. For example, the first force bearing feature 902 may include a fill material 926 having a cell structure (not shown) extending end-to-end along the fill material 926. In this regard, the packaging apparatus 900 may be positioned against an item (not shown) to be protected by the packaging apparatus 900 such that a longitudinal portion of the fill material 926 is inline, or parallel, with the forces acting on the packaging apparatus 900, and in particular, the first force bearing feature 902. The second force bearing feature 904 and the third force bearing feature 906 may include any feature(s) and/or component(s) previously described for the first force bearing feature 902.

Figure 22:
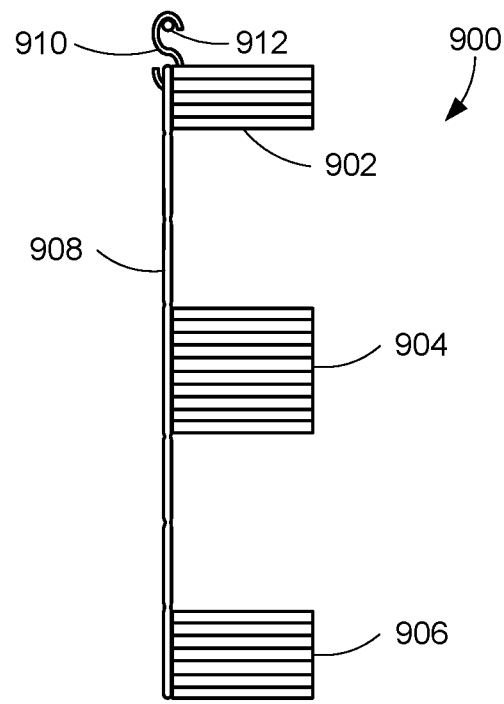
FIG. 22 illustrates a side view of the packaging apparatus shown in FIG. 21, showing the packaging apparatus in an extended configuration.

Also, rather than standing upright on a ground surface, the packaging apparatus 900 may include a hook 910 designed to secure with the base feature 908 and suspend the packaging apparatus 900 from a fixture positioned above, or approximately above, the packaging apparatus 900. For example, FIG. 22 illustrates a side view of the packaging apparatus 900 shown in FIG. 21, showing the packaging apparatus 900 in an extended configuration. As shown, when the hook 910 is secured to an article 912, the base feature 908 may unfold and the force bearing features may separate from one another (assuming, of course, that the packaging apparatus 900 is sufficient above the ground or other surface) by gravity. The article 912 may include a bar or rod extending along a ceiling of a transport vehicle, as a non-limiting example. In this manner, the force bearing feature may be positioned to protect an item (not shown) by providing a counterforce to a force (or forces) exerted in a direction toward the item, in a manner previously described. Also, while a hook 910 is shown in FIG. 22, other securing mechanisms are possible.

Figure 23:
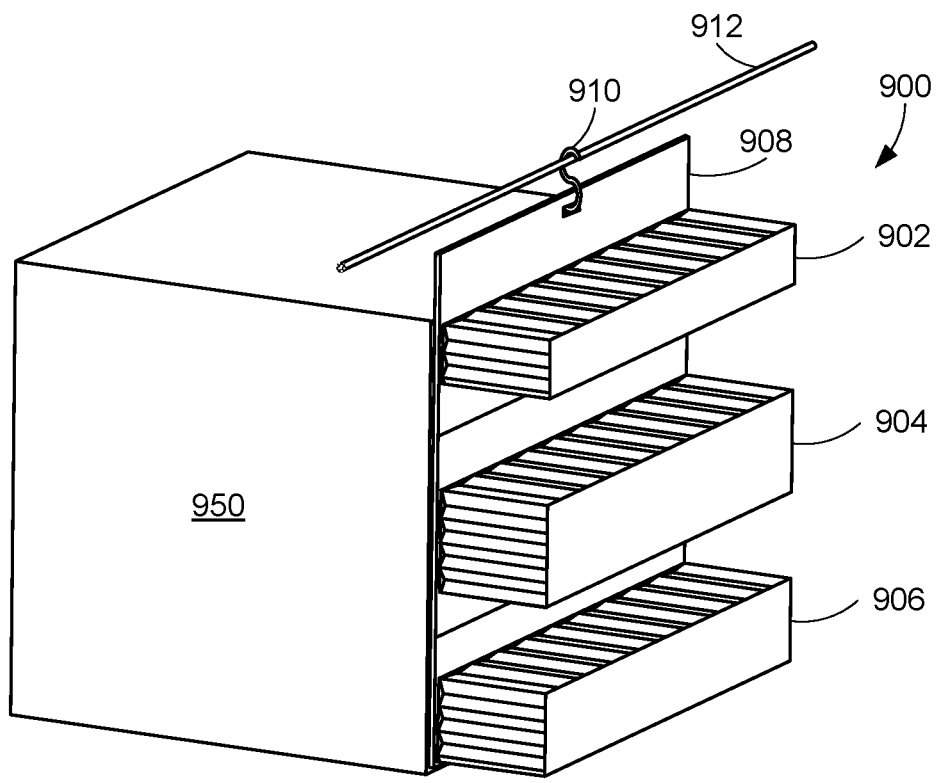
FIG. 23 illustrates an isometric view of the packaging apparatus shown in FIG. 22, showing the packaging apparatus in the extended configuration to provide protection for an item, in accordance with the described embodiments.

FIG. 23 illustrates an isometric view of the packaging apparatus 900 shown in FIG. 22, showing the packaging apparatus 900 in the extended configuration to provide protection for an item 950, in accordance with the described embodiments. As shown, the first force bearing feature 902, the second force bearing feature 904, and the third force bearing feature 906 may be positioned horizontally along the base feature 908, as opposed to vertical positioning with respect to a base feature in prior embodiments. This may prevent taller objects that exert a force in a direction toward the item 950 from passing between adjacent force bearing features. When not in use, the packaging apparatus 900 may collapse back to the collapsible configuration (shown in FIG. 21) in order to reduce space that would otherwise be occupied by the packaging apparatus 900.

Also, in some embodiments, the force bearing features generally include a similar size and shape. However, in the embodiment shown in FIG. 23, the force bearing features include different dimensions. For example, the second force bearing feature 904 (also the central force bearing feature) may include a size and shape larger than that of the first force bearing feature 902 and the third force bearing feature 906 (both of which may be referred to as outer force bearing features). Further, the third force bearing feature 906 (also the lower force bearing feature) may include a size and a shape larger than that of the first force bearing feature 902 (also the upper force bearing feature). While a particular configuration in terms of size and shape of force bearing features is shown, other configurations are possible.

Figure 24:
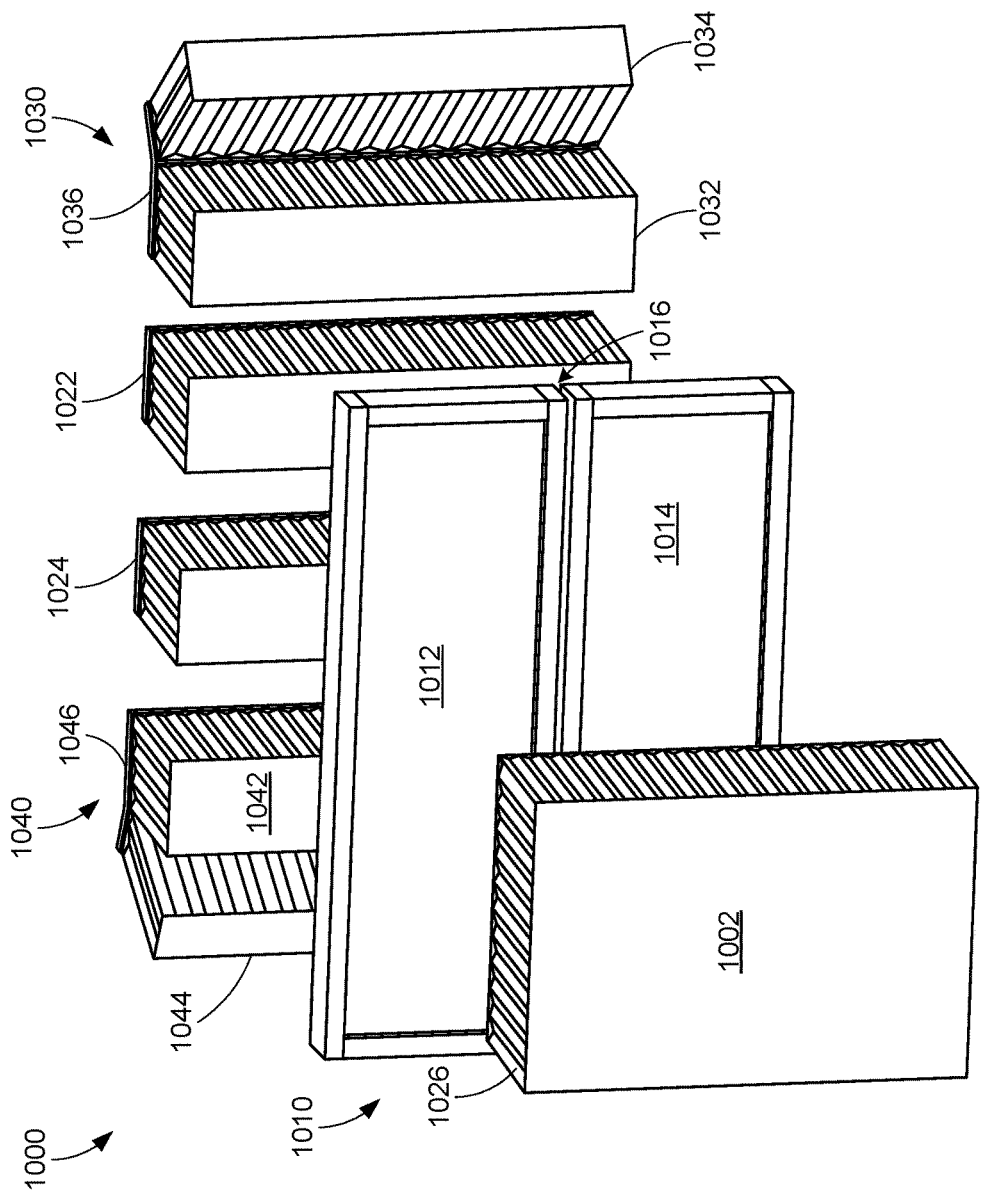
FIG. 24 illustrates an isometric view of an alternate embodiment of a packaging apparatus, showing multiple force bearing features surrounding several base features, in accordance with the described embodiments.

FIG. 24 illustrates an isometric view of an alternate embodiment of a packaging apparatus 1000, showing multiple force bearing features surrounding several base features, in accordance with the described embodiments. As shown, the packaging apparatus 1000 may include a first force bearing feature 1002 secured with a base member 1010 at a first location (or first surface) of the base member 1010 by an adhesive, as a non-limiting example. As shown, the base member 1010 may include a first base feature 1012 and a second base feature 1014. The first base feature 1012 and the second base feature 1014 may include angled boards designed to assist in distributing force and to engage other features. This will be discussed below. Also, the first base feature 1012 and the second base feature 1014 may be separated a gap 1016 that allows a user to grasp the packaging apparatus 1000 (when assembled) and manually transport the packaging apparatus 1000. While the base member 1010 is shown as having two separate pieces, in other embodiments, the base member 1010 includes a single, continuous base member.

The packaging apparatus 1000 may include additional force bearing features. For example, the packaging apparatus 1000 may include a fourth force bearing feature 1022 and a fifth force bearing feature 1024. The fourth force bearing feature 1022 and the fifth force bearing feature 1024 may be secured with the base member 1010 by an adhesive, as a non-limiting example, at a second location (or second surface) of the base member 1010 opposite the first location.

In order to increase the force bearing capabilities, the packaging apparatus 1000 may include additional force bearing feature disposed at different orientations. For example, the packaging apparatus 1000 may further include a first force bearing member 1030 and a second force bearing member 1040. As shown, the first force bearing member 1030 may include a first force bearing feature 1032 and a second force bearing feature 1034, both of which are secured with a base feature 1036 that extends along both the first force bearing feature 1032 and the second force bearing feature 1034. The base feature 1036 may include a sheet of material having a slit (not shown) in a central region between the first force bearing feature 1032 and the second force bearing feature 1034. In this regard, when the packaging apparatus 1000 is assembled, the first force bearing feature 1032 may be secured with the base member 1010 at the second location by an adhesive, as a non-limiting example, while the second force bearing feature 1034 is movable or rotatable with respect to the first force bearing feature 1032 due in part to the aforementioned slit in the base feature 1036. This may allow the second force bearing feature 1034 to be positioned in a desired manner to protect an item or items. This will be shown below. Also, the second force bearing member 1040 may include a first force bearing feature 1042 and a second force bearing feature 1044, both of which are secured with a base feature 1046 that extends along both the first force bearing feature 1042 and the second force bearing feature 1044. In this regard, the second force bearing member 1040 may include any feature or features, and may function in a manner similar to that of the first force bearing member 1030. Also, the first force bearing member 1030 and the second force bearing member 1040 may be referred to as dual force bearing members.

Also, in accordance with the described embodiments, the force bearing features may include a fill material in a manner previously described. For example, the first force bearing feature 1002 may include a fill material 1026 having a cell structure (not shown) extending end-to-end along the fill material 1026. In this regard, the packaging apparatus 1000 may be positioned against an item (not shown) to be protected by the packaging apparatus 1000 such that a longitudinal portion of the fill material 1026 is inline, or parallel, with the forces acting on the packaging apparatus 1000, and in particular, the first force bearing feature 1002. The remaining force bearing feature shown and described in FIG. 24 may include a similar configuration.

Figure 25:
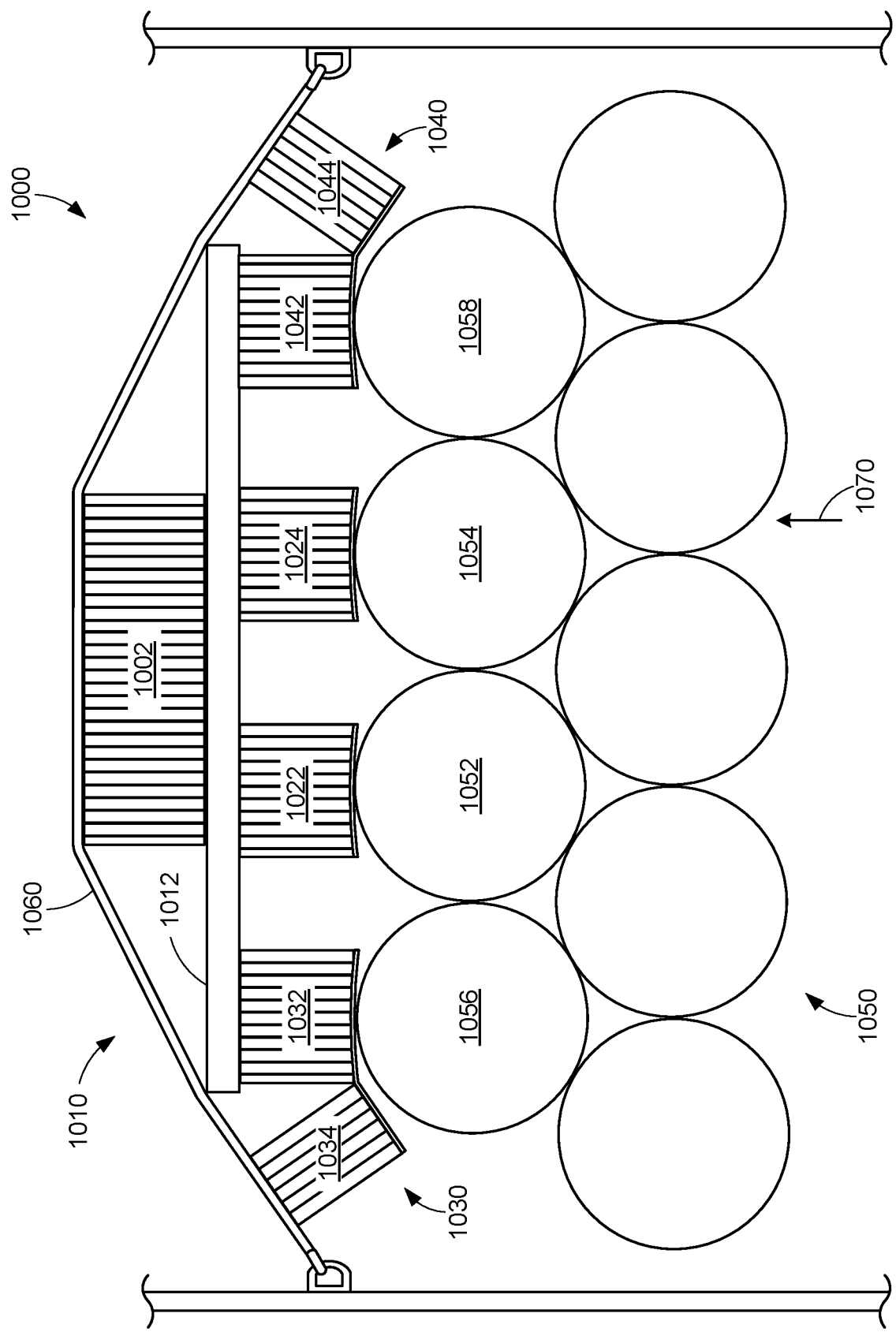
FIG. 25 illustrates a plan view of the packaging apparatus shown in FIG. 24, showing the packaging apparatus positioned to provide protection for several items, in accordance with the described embodiments.

FIG. 25 illustrates a plan view of the packaging apparatus 1000 shown in FIG. 24, showing the packaging apparatus 1000 positioned to provide protection for items 1050, in accordance with the described embodiments. As shown, the items 1050 may include a cylindrical shape. However, the packaging apparatus 1000 may nonetheless provide protection during transportation of the items 1050. For example, as shown in FIG. 25, the fourth force bearing feature 1022 and the fifth force bearing feature 1024 may engage a first item 1052 and a second item 1054, respectively, while remaining stationary with respect to the base member 1010, which includes the first base feature 1012 and the second base feature 1014 (shown in FIG. 24). Moreover, the fourth force bearing feature 1022 and the fifth force bearing feature 1024 may be positioned or fitted onto the base member 1010 such that the fourth force bearing feature 1022 and the fifth force bearing feature 1024 are centered with respect to the first item 1052 and the second item 1054, respectively. This may allow the fourth force bearing feature 1022 and the fifth force bearing feature 1024 to counter a maximum impact force provided by the first item 1052 and the second item 1054, respectively. Further, this may prevent or limit the items from sliding laterally with respect to the force bearing features. Also, the first force bearing feature 1032 of the first force bearing member 1030 and the first force bearing feature 1042 of the second force bearing member 1040 may engage a third item 1056 and a fourth item 1058, respectively, while also remaining stationary with respect to the base member 1010. As shown, the first force bearing feature 1032 (of the first force bearing member 1030) and the first force bearing feature 1042 (of the second force bearing member 1040) are centered with respect to the third item 1056 and the fourth item 1058, respectively. However, the second force bearing feature 1034 of the first force bearing member 1030 and the second force bearing feature 1044 of the second force bearing member 1040 may engage the third item 1056 and the fourth item 1058, respectively, at an angle with respect to the base member 1010. The angle may be a non-zero angle defining a diagonal with respect to the base member 1010 (or with respect to an adjacent force bearing feature). In this manner, the packaging apparatus 1000 may provide additional counterforce in a crosswise direction, rather than just a longitudinal direction. This will be described below.

As shown in FIG. 25, the items 1050 provide a force to the packaging apparatus 1000 in a direction of an arrow 1070. Further, the fourth force bearing feature 1022, the fifth force bearing feature 1024, the first force bearing feature 1032 (of the first force bearing member 1030), and the first force bearing feature 1042 (of the second force bearing member 1040) provide a "front line" as a first point of contact with the items 1050. These force bearing features can absorb forces from the items 1050 and at least partially deform in accordance with the shape of the items 1050. Also, these force bearing features can provide a counterforce to the items 1050 to limit or prevent further movement of the items 1050. Further, when the first force bearing feature 1032 (of the first force bearing member 1030), and the first force bearing feature 1042 (of the second force bearing member 1040) undergo additional force or forces in the direction of the arrow 1070, the second force bearing feature 1034 (of the first force bearing member 1030), and the second force bearing feature 1044 (of the second force bearing member 1040) may also engage the items 1050, and deform and counter the force from the items 1050 in a similar manner.

Also, as shown in FIG. 25, the first force bearing feature 1002 is generally positioned at a location corresponding to the fourth force bearing feature 1022 and the fifth force bearing feature 1024. Further, the first force bearing feature 1002 includes an end-to-end length similar, or approximately, similar to that of the fourth force bearing feature 1022 and the fifth force bearing feature 1024. In this regard, the first force bearing feature 1002, in conjunction with the base member 1010, can provide direct support to the fourth force bearing feature 1022 and the fifth force bearing feature 1024, as the force may be relatively higher at centrally located regions of the packaging apparatus 1000, such as the fourth force bearing feature 1022 and the fifth force bearing feature 1024.

Further, when the items 1050 create a load or force against the packaging apparatus 1000, the base member 1010—including the first base feature 1012 and the second base feature 1014 (shown in FIG. 24)—provides structural support to the aforementioned force bearing features that initially engage the items 1050. This is due in part the generally central location of the base member 1010 relative to other structural components of the packaging apparatus 1000. In this regard, at least some of the force provide to the force bearing features may pass to the base member 1010, and may then be redistributed along various regions of the base member 1010.

The packaging apparatus 1000 may be used in conjunction with a strap 1060 extending along the packaging apparatus 1000 and secures at two ends of a transport apparatus, as a non-limiting example. In some instances, the strap 1060 is secured to opposing walls of a transport mechanism, such as a trailer or cable car. Although not shown, there may be additional straps positioned along the packaging apparatus 1000 in a manner similar to that of the strap 1060. In order to provide enhanced force protection for the items 1050, the strap 1060 may engage the packaging apparatus 1000 at several locations. For example, as shown in FIG. 25, the packaging apparatus 1000 is positioned such that the strap 1060 engages multiple edges of the second force bearing feature 1034 of the first force bearing member 1030 as well as multiple edges of the second force bearing feature 1044 of the second force bearing member 1040 (at the respective ends of the strap 1060). The strap 1060 may further engage multiple edges of the base member 1010.

The strap 1060 may provide the packaging apparatus 1000 with an active counterforce mechanism. In this regard, the strap 1060 can increase its counterforce in proportion with the force, and accordingly, can provide a counterforce proportional with respect to the force provided by the items 1050. Further, based on the configuration of the packaging apparatus 1000, the strap 1060 may support the force (from the items 1050) equally along multiple contacts points between the strap 1060 and the first force bearing feature 1002, as well as multiple contact points between the strap 1060 and the first base feature 1012 (a similar configuration is possible for a second strap engaging the second base feature 1014, shown in FIG. 24). Further, the aforementioned angled boards of the first base feature 1012 may distribute forces to the strap 1060. The strap 1060 can provide a counterforce distributed through the first base feature 1012, which can then be distributed to the force bearing features engaging the items 1050. This may provide protection to the items 1050 not only in a direction of the arrow 1070, defining a longitudinal direction, but also in directions perpendicular with respect to the arrow 1070, defining a crosswise direction. The crosswise support may be provide in part by the angled force bearing features, that is, the second force bearing feature 1034 (of the first force bearing member 1030) and the second force bearing feature 1044 (of the second force bearing member 1040). Also, the strap 1060 may provide the additional support to the aforementioned angled force bearing features.

Figure 26:
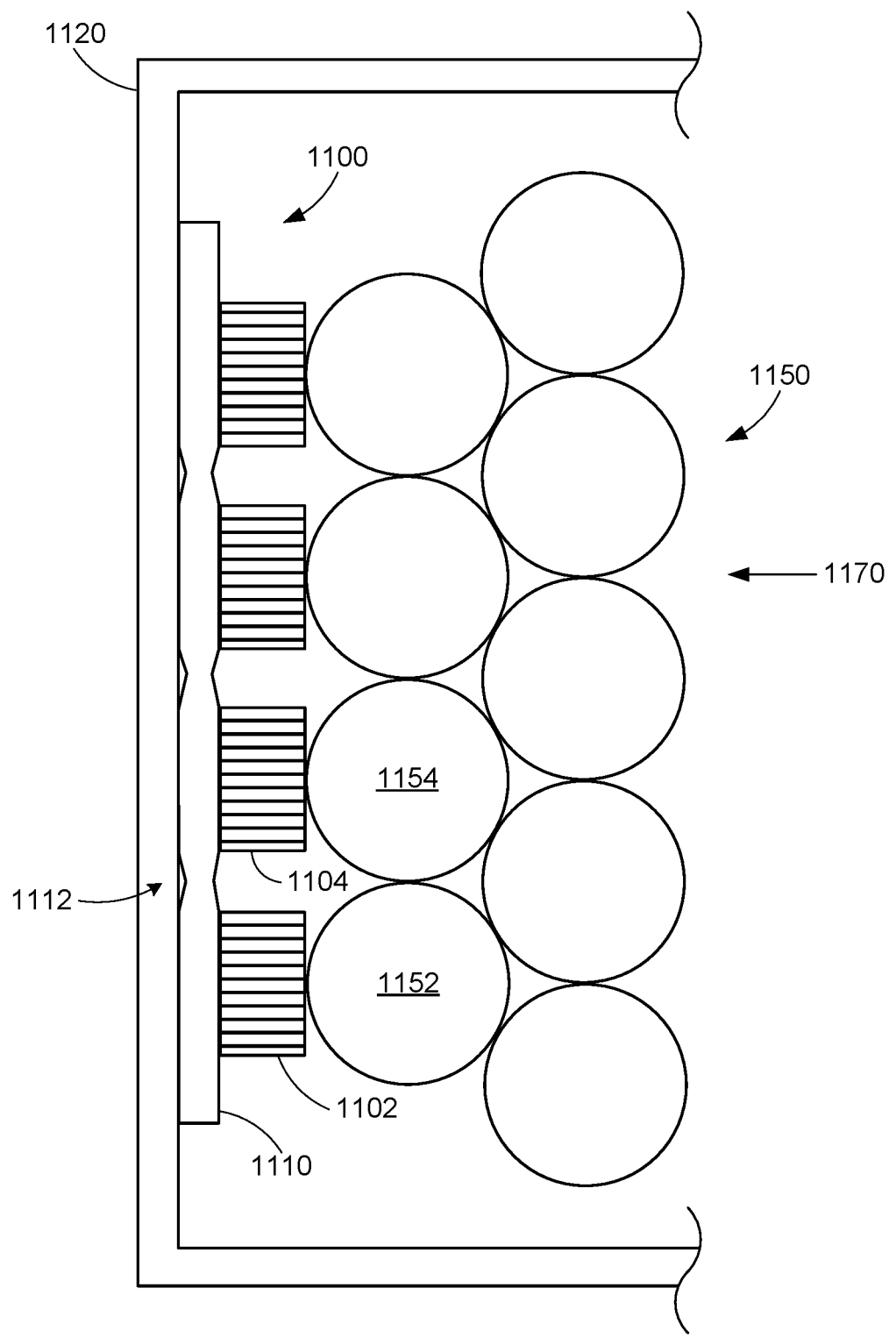
FIG. 26 illustrates a plan view of an alternate embodiment of a packaging apparatus, in accordance with the described embodiments.

FIG. 26 illustrates a plan view of an alternate embodiment of a packaging apparatus 1100, in accordance with the described embodiments. As shown, a packaging apparatus 1100 may include several force bearing features secured with a base member 1110, which may include any component described for the base member 1010 (shown in FIGS. 24 and 25). Further, the force bearing features are designed to provide protection to a transport container 1120, and in particular, at an end of the transport container 1120. A second packaging apparatus (not shown) similar to the packaging apparatus 1100 may be positioned at a second end (not shown) of the transport container 1120.

As shown in FIG. 26, the force bearing features of the packaging apparatus 1100 are designed to protect to the transport container 1120 against force provided by items 1150 carried by the transport container 1120. For example, a first force bearing feature 1102 and a second force bearing feature 1104 can align with a first item 1152 and a second item 1154, respectively, to provide force absorption in a direction toward the arrow 1170. Accordingly, the force bearing features can be positioned at predetermined locations associated with a predicted force impact by the items 1150. Further, the first force bearing feature 1102 and the second force bearing feature 1104 can distribute at least some of the force to the base member 1110, and the base member 1110 can distribute these force along various regions (of the base member 1110).

Also, when the packaging apparatus 1100 is not in use, the base member 1110 may include one or more foldable regions between adjacent force bearing features. For example, the base member 1110 includes a first fold region 1112 between the first force bearing feature 1102 and the second force bearing feature 1104. The first fold region 1112 allows the base member 1110 to collapse such that the packaging apparatus 1100 can reduce its footprint when not in use. This can save space in a warehouse or during transit, to allow additional storage room for more shipping goods.

Figure 27:
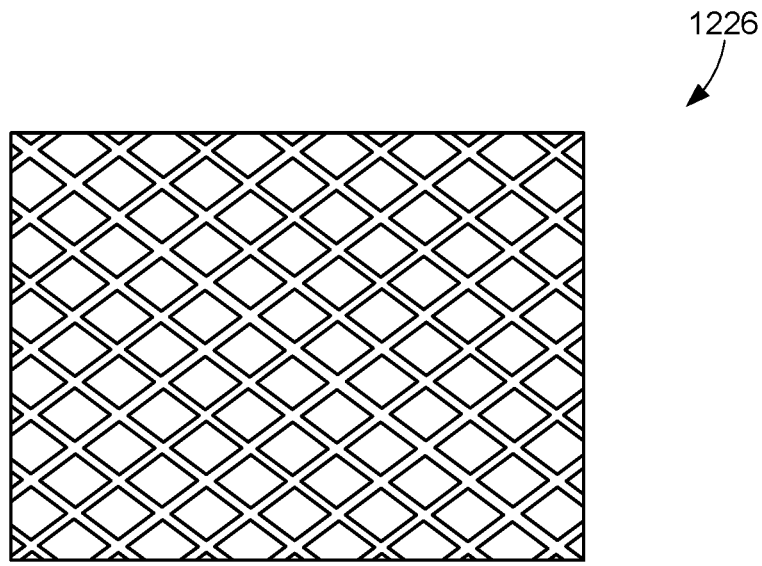
FIG. 27 illustrates a side view of an alternate embodiment of a fill material, in accordance with the described embodiments.
Figure 28:
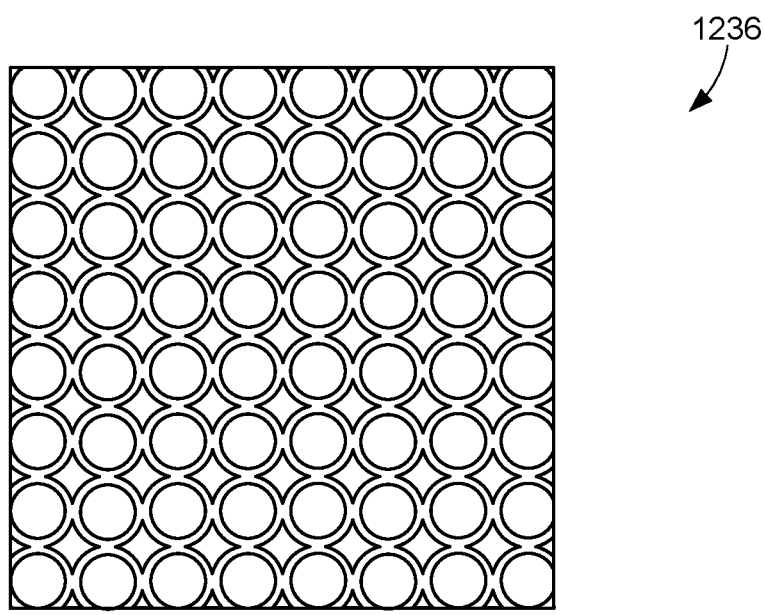
FIG. 28 illustrates a side view of an alternate embodiment of a fill material, in accordance with the described embodiments.

The fill material of the force bearing features of the described embodiments may also vary. For example, FIG. 27 illustrates a side view of an alternate embodiment of a fill material 1226, in accordance with the described embodiments. As shown, the fill material 1226 may include a cell structure having a diamond-shape design. Additional polygonal shapes are possible. FIG. 28 illustrates a side view of an alternate embodiment of a fill material 1326, in accordance with the described embodiments. As shown, the fill material 1326 may include a cell structure having a circular design, providing for a fill material 1326 having several cylindrical members. The various types of fill materials, along with the type of material (including paper), may be used to create a desired force resistance of a packaging apparatus. Also, in some embodiments (not shown), the fill material includes foam.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A packaging apparatus for protecting one or more items, the packaging apparatus comprising:
    a base comprising a first surface and a second surface opposite the first surface;
    a first force bearing feature coupled to the first surface; and
    a first force bearing member comprising:
        a second force bearing feature coupled to the second surface, and
        a third force bearing feature rotationally coupled to the second force bearing feature by a base member that allows the third force bearing feature to rotate relative to the second force bearing feature; and
    a second force bearing member, comprising:
        a fourth force bearing feature coupled to the second surface, and
        a fifth force bearing feature rotationally coupled to the fourth force bearing feature by a second base member that allows the fifth force bearing feature to rotate relative to the fourth force bearing feature,
    wherein:
        the base comprises a first edge and a second edge opposite the first edge,
        the third force bearing feature extends laterally beyond the first edge, and
        the fifth force bearing feature extends laterally beyond the second edge.

2. The packaging apparatus of claim 1, wherein the second force bearing feature and the third force bearing feature are capable of at least partially surrounding the one or more items.

3. The packaging apparatus of claim 1, further comprising a sixth base feature coupled to the second surface, the sixth base feature positioned between the first force bearing member and the second force bearing member.

4. The packaging apparatus of claim 3, wherein the first force bearing feature comprises a first size, and wherein the second force bearing feature comprises a second size that is less than the first size.

5. The packaging apparatus of claim 1, further comprising a strap that engages the first force bearing feature, the third force bearing feature, and the fifth force bearing feature.

6. The packaging apparatus of claim 1, further comprising a strap configured to engage the first edge and the second edge of the base.

7. The packaging apparatus of claim 6, wherein the strap provides a counterforce.

8. A packaging apparatus for protecting one or more items, the packaging apparatus comprising:
    a first base comprising a first surface and a second surface opposite the first surface, the first base further comprising a first edge and a second edge opposite the first edge;
    a first force bearing feature coupled to the first surface;
    a second force bearing feature coupled to the second surface; and
    a strap capable of securing to a first wall and a second wall, wherein when the second force bearing feature engages at least one of the one or more items, the strap engages the first force bearing feature, the first edge, and the second edge; and
    a second base separated from the first base by a gap.

9. The packaging apparatus of claim 8, further comprising a force bearing member comprising:
    a third force bearing feature coupled to the second surface, and
    a fourth force bearing feature rotationally coupled to the third force bearing feature by a base member that allows the fourth force bearing feature to rotate relative to the third force bearing feature.

10. The packaging apparatus of claim 9, wherein when the second force bearing feature engages at least one of the one or more items, the strap engages the fourth force bearing feature.

11. The packaging apparatus of claim 9, wherein the third force bearing feature and the fourth force bearing feature conform to the one or more items.

12. The packaging apparatus of claim 8, wherein:
    the fourth base feature extends laterally beyond the first edge.

13. The packaging apparatus of claim 8, wherein the first force bearing feature comprises a honeycomb configuration.

14. The packaging apparatus of claim 8, wherein the first base and the second base each define an angled base configured to distribute force to the strap.

15. A packaging apparatus for protecting one or more items, the packaging apparatus comprising:
    a first base;
    a second base separated from the first base by a gap;
    a first force bearing feature coupled a first surface of the first base and the second base,
    a second force bearing feature coupled to a second surface of the first base and the second base, the second surface opposite the first surface; and
    a force bearing member coupled to the second surface, the force bearing member comprising:
        a third force bearing feature coupled to the second surface, and
        a fourth force bearing feature rotationally coupled to the third force bearing feature by a base member that allows the fourth force bearing feature to rotate relative to the third force bearing feature.

16. The packaging apparatus of claim 15, wherein:
    the force bearing member defines a first force bearing member, and
    the packaging apparatus further comprises a second force bearing member, the second force bearing member comprising:
        a fifth force bearing feature coupled to the second surface, and
        a sixth force bearing feature rotationally coupled to the fifth force bearing feature by a second base member that allows the sixth force bearing feature to rotate relative to the fifth force bearing feature.

17. The packaging apparatus of claim 16, wherein the third force bearing feature and the fourth force bearing feature conform a first item of the one or more items, and wherein the fifth force bearing feature and the sixth force bearing feature conform a second item of the one or more items, the second item being different from the first item.

18. The packaging apparatus of claim 16, wherein:
the first force bearing feature comprises a first edge and a second edge opposite the first edge,
the fourth force bearing feature extends laterally beyond the first edge, and
the sixth force bearing feature extends laterally beyond the second edge.

19. The packaging apparatus of claim 18, further comprising a strap extends along and engages the first force bearing feature, the first edge, and the second edge.

20. The packaging apparatus of claim 19, wherein the second force bearing feature engages the one or more items.

\* \* \* \* \*